United States Patent
Bergdale et al.

(10) Patent No.: US 10,375,573 B2
(45) Date of Patent: Aug. 6, 2019

(54) SHORT RANGE WIRELESS TRANSLATION METHODS AND SYSTEMS FOR HANDS-FREE FARE VALIDATION

(71) Applicant: Bytemark, Inc., New York, NY (US)

(72) Inventors: Micah Bergdale, New York, NY (US); Nicholas Ihm, New York, NY (US); Kevin Rejko, New York, NY (US); Michael O'Haire, Smithtown, NY (US); Edward J. Donovan, New York, NY (US)

(73) Assignee: Bytemark, Inc.

( * ) Notice: Subject to any disclaimer, the term of this patent is extended or adjusted under 35 U.S.C. 154(b) by 0 days.

(21) Appl. No.: 15/228,232

(22) Filed: Aug. 4, 2016

(65) Prior Publication Data

US 2017/0055157 A1    Feb. 23, 2017

Related U.S. Application Data

(60) Provisional application No. 62/206,196, filed on Aug. 17, 2015.

(51) Int. Cl.
*H04W 12/08* (2009.01)
*H04W 40/24* (2009.01)
(Continued)

(52) U.S. Cl.
CPC ............ *H04W 12/08* (2013.01); *G07B 15/02* (2013.01); *G07B 15/04* (2013.01);
(Continued)

(58) Field of Classification Search
CPC ..... H04W 12/08; H04W 4/008; H04W 4/021; H04W 40/244; H04M 1/7253; H04M 2250/02
See application file for complete search history.

(56) References Cited

U.S. PATENT DOCUMENTS

| 4,193,114 A | 3/1980 | Benini |
| 5,253,166 A | 10/1993 | Dettelbach |

(Continued)

FOREIGN PATENT DOCUMENTS

| EP | 1439495 A1 | 7/2004 |
| GB | 2390211 | 12/2003 |

(Continued)

OTHER PUBLICATIONS

Scott Boyter, "Aeritas tried to fill void until 3G wireless is ready; Mobile boarding pass is just one application being tested", all pages, Dallaw Forth Worth TechBiz, Feb. 19, 2001.

(Continued)

*Primary Examiner* — Nathan A Mitchell
(74) *Attorney, Agent, or Firm* — Jennifer Meredith, Esq.; Meredith Attorneys, PLLC

(57) ABSTRACT

A system and method in which the Bluetooth technology is used in conjunction with a user application on a mobile device to facilitate hands-free fare validation at a transit station. The user app communicates with a controller driver in a controller unit that interfaces with a compliant fare gate. Bluetooth beacons are used to determine a passenger's proximity to the gate and camera-like devices determine whether a passenger has entered a fare validation zone. A user with a valid and active electronic ticket on their mobile device may simply walk through the fare gate "hands free" without the need to search for a physical ticket or a smartcard or a mobile phone. This hassle-free approach significantly improves the user experience and passenger throughput through fare gates. The Bluetooth-based automated fare validation system also detects passengers with valid electronic tickets and those without a valid permit for travel.

8 Claims, 5 Drawing Sheets

(51) Int. Cl.
*H04W 4/021* (2018.01)
*H04W 4/80* (2018.01)
*H04M 1/725* (2006.01)
*G07B 15/02* (2011.01)
*G07B 15/04* (2006.01)

(52) U.S. Cl.
CPC ......... *H04M 1/7253* (2013.01); *H04W 4/021* (2013.01); *H04W 4/80* (2018.02); *H04W 40/244* (2013.01); *H04M 2250/02* (2013.01)

(56) References Cited

U.S. PATENT DOCUMENTS

| | | | |
|---|---|---|---|
| 5,465,084 A | 11/1995 | Cottrell | |
| 5,559,961 A | 9/1996 | Blonder | |
| 5,590,038 A | 12/1996 | Pitroda | |
| 5,621,797 A | 4/1997 | Rosen | |
| 5,777,305 A | 7/1998 | Smith | |
| 5,789,732 A | 8/1998 | McMahon | |
| 5,797,330 A | 8/1998 | Li | |
| 5,907,830 A | 5/1999 | Engel | |
| 5,918,909 A | 7/1999 | Fiala | |
| 6,023,679 A | 2/2000 | Acebo | |
| 6,023,688 A | 2/2000 | Ramachandran | |
| 6,085,976 A | 7/2000 | Sehr | |
| 6,175,922 B1 | 1/2001 | Wang | |
| 6,251,017 B1 | 6/2001 | Leeson | |
| 6,315,195 B1 | 11/2001 | Ramachandran | |
| 6,373,587 B1 | 4/2002 | Sansone | |
| 6,393,305 B1 | 5/2002 | Ulvinen | |
| 6,454,174 B1 | 9/2002 | Sansone | |
| 6,473,739 B1 | 10/2002 | Showghi | |
| 6,484,182 B1 | 11/2002 | Dunphy | |
| 6,493,110 B1 | 12/2002 | Roberts | |
| 6,496,809 B1 | 12/2002 | Nakfoor | |
| 6,685,093 B2 | 2/2004 | Challa | |
| 6,690,794 B1* | 2/2004 | Terao | H04L 9/3013 235/375 |
| 6,775,539 B2 | 8/2004 | Deshpande | |
| 6,961,858 B2 | 11/2005 | Fransdonk | |
| 6,997,384 B2 | 2/2006 | Hara | |
| 7,017,806 B2 | 3/2006 | Peterson | |
| 7,020,635 B2 | 3/2006 | Hamilton | |
| 7,024,807 B2 | 4/2006 | Street | |
| 7,044,362 B2 | 5/2006 | Yu | |
| 7,080,049 B2 | 7/2006 | Truitt | |
| 7,090,128 B2 | 8/2006 | Farley | |
| 7,093,130 B1 | 8/2006 | Kobayashi | |
| 7,103,572 B1 | 9/2006 | Kawaguchi | |
| 7,107,462 B2 | 9/2006 | Fransdonk | |
| 7,134,087 B2 | 11/2006 | Bushold | |
| 7,150,045 B2 | 12/2006 | Koelle | |
| 7,158,939 B2 | 1/2007 | Goldstein | |
| 7,174,462 B2 | 2/2007 | Pering | |
| 7,191,221 B2 | 3/2007 | Schatz | |
| 7,263,506 B2 | 8/2007 | Lee | |
| 7,315,944 B2 | 1/2008 | Dutta | |
| 7,386,517 B1 | 6/2008 | Donner | |
| 7,392,226 B1* | 6/2008 | Sasaki | G06Q 20/045 705/64 |
| 7,395,506 B2 | 7/2008 | Tan | |
| 7,493,261 B2 | 2/2009 | Chen | |
| 7,520,427 B2 | 4/2009 | Boyd | |
| 7,529,934 B2 | 5/2009 | Fujisawa | |
| 7,555,284 B2 | 6/2009 | Yan | |
| 7,567,910 B2 | 7/2009 | Hasegawa | |
| 7,587,502 B2 | 9/2009 | Crawford | |
| 7,617,975 B2 | 11/2009 | Wada | |
| 7,711,586 B2 | 5/2010 | Aggarwal | |
| 7,933,589 B1 | 4/2011 | Mamdani | |
| 7,967,211 B2 | 6/2011 | Challa | |
| 8,010,128 B2 | 8/2011 | Silverbrook | |
| 8,016,187 B2 | 9/2011 | Frantz | |
| 8,019,365 B2 | 9/2011 | Fisher | |
| 8,370,180 B2 | 2/2013 | Scott | |
| 8,379,874 B1 | 2/2013 | Simon | |
| 8,457,354 B1 | 6/2013 | Kolar | |
| 8,473,342 B1 | 6/2013 | Roberts | |
| 8,583,511 B2 | 11/2013 | Hendrickson | |
| 8,584,224 B1 | 11/2013 | Pei | |
| 8,739,260 B1* | 5/2014 | Damm-Goossens | H04W 12/06 726/4 |
| 8,788,836 B1 | 7/2014 | Hernacki | |
| 8,912,879 B2 | 12/2014 | Fyke | |
| 8,935,802 B1 | 1/2015 | Mattsson | |
| 9,317,976 B2* | 4/2016 | Andrews | G07B 15/00 |
| 9,633,493 B2* | 4/2017 | Raina | G07C 9/00007 |
| 9,905,101 B1* | 2/2018 | Billau | H04W 4/04 |
| 2001/0005840 A1 | 6/2001 | Verkama | |
| 2001/0014870 A1 | 8/2001 | Saito | |
| 2001/0016825 A1 | 8/2001 | Pugliese | |
| 2001/0037174 A1 | 11/2001 | Dickerson | |
| 2001/0044324 A1 | 11/2001 | Carayiannis | |
| 2001/0051787 A1 | 12/2001 | Haller | |
| 2001/0052545 A1 | 12/2001 | Serebrennikov | |
| 2001/0054111 A1 | 12/2001 | Lee | |
| 2002/0010603 A1 | 1/2002 | Doi | |
| 2002/0016929 A1 | 2/2002 | Harashima | |
| 2002/0023027 A1 | 2/2002 | Simonds | |
| 2002/0040308 A1 | 4/2002 | Hasegawa | |
| 2002/0040346 A1 | 4/2002 | Kwan | |
| 2002/0060246 A1 | 5/2002 | Gobburu | |
| 2002/0065713 A1 | 5/2002 | Awada | |
| 2002/0065783 A1 | 5/2002 | Na | |
| 2002/0087410 A1* | 7/2002 | Walker | G06Q 30/02 705/14.36 |
| 2002/0090930 A1* | 7/2002 | Fujiwara | G07C 9/00111 455/410 |
| 2002/0094090 A1 | 7/2002 | Iino | |
| 2002/0126780 A1 | 9/2002 | Oshima | |
| 2002/0138346 A1 | 9/2002 | Kodaka | |
| 2002/0145505 A1 | 10/2002 | Sata | |
| 2002/0167537 A1* | 11/2002 | Trajkovic | G06K 9/32 345/649 |
| 2002/0184539 A1 | 12/2002 | Fukuda | |
| 2002/0196274 A1 | 12/2002 | Comfort | |
| 2003/0036929 A1 | 2/2003 | Vaughan | |
| 2003/0066883 A1 | 4/2003 | Yu | |
| 2003/0069763 A1 | 4/2003 | Gathman | |
| 2003/0069827 A1 | 4/2003 | Gathman | |
| 2003/0093695 A1 | 5/2003 | Dutta | |
| 2003/0105641 A1 | 6/2003 | Lewis | |
| 2003/0105954 A1 | 6/2003 | Immonen | |
| 2003/0105969 A1 | 6/2003 | Matsui | |
| 2003/0154169 A1 | 8/2003 | Yanai | |
| 2003/0163787 A1 | 8/2003 | Hay | |
| 2003/0164400 A1* | 9/2003 | Boyd | G06Q 10/02 235/382 |
| 2003/0172037 A1* | 9/2003 | Jung | G06Q 30/06 705/64 |
| 2003/0200184 A1 | 10/2003 | Dominguez | |
| 2003/0229790 A1 | 12/2003 | Russell | |
| 2003/0233276 A1 | 12/2003 | Pearlman | |
| 2004/0019564 A1 | 1/2004 | Goldthwaite | |
| 2004/0019792 A1 | 1/2004 | Funamoto | |
| 2004/0030081 A1 | 2/2004 | Hegi | |
| 2004/0030091 A1 | 2/2004 | McCullough | |
| 2004/0030658 A1 | 2/2004 | Cruz | |
| 2004/0039635 A1* | 2/2004 | Linde | G06Q 20/04 705/14.26 |
| 2004/0085351 A1 | 5/2004 | Tokkonen | |
| 2004/0101158 A1 | 5/2004 | Butler | |
| 2004/0111373 A1 | 6/2004 | Iga | |
| 2004/0128509 A1 | 7/2004 | Gehrmann | |
| 2004/0148253 A1 | 7/2004 | Shin | |
| 2004/0169589 A1 | 9/2004 | Lea | |
| 2004/0186884 A1 | 9/2004 | Dutordoir | |
| 2004/0210476 A1 | 10/2004 | Blair | |
| 2004/0224703 A1 | 11/2004 | Takaki | |
| 2004/0250138 A1 | 12/2004 | Schneider | |
| 2005/0059339 A1 | 3/2005 | Honda | |
| 2005/0060554 A1 | 3/2005 | ODonoghue | |

(56) References Cited

U.S. PATENT DOCUMENTS

| | | | |
|---|---|---|---|
| 2005/0070257 A1* | 3/2005 | Saarinen | G07B 15/00 455/414.1 |
| 2005/0108912 A1 | 5/2005 | Bekker | |
| 2005/0109838 A1 | 5/2005 | Linlor | |
| 2005/0111723 A1 | 5/2005 | Hannigan | |
| 2005/0116030 A1 | 6/2005 | Wada | |
| 2005/0137889 A1 | 6/2005 | Wheeler | |
| 2005/0204140 A1 | 9/2005 | Maruyama | |
| 2005/0212760 A1 | 9/2005 | Marvit | |
| 2005/0240484 A1* | 10/2005 | Yan | G06Q 20/045 455/411 |
| 2005/0240589 A1 | 10/2005 | Altenhofen | |
| 2005/0246634 A1 | 11/2005 | Ortwein | |
| 2005/0252964 A1 | 11/2005 | Takaki | |
| 2005/0253817 A1 | 11/2005 | Rytivaara | |
| 2005/0272473 A1 | 12/2005 | Sheena | |
| 2005/0283444 A1 | 12/2005 | Ekberg | |
| 2006/0120607 A1 | 6/2006 | Lev | |
| 2006/0161446 A1 | 7/2006 | Fyfe | |
| 2006/0174339 A1 | 8/2006 | Tao | |
| 2006/0206724 A1 | 9/2006 | Schaufele | |
| 2006/0206728 A1 | 9/2006 | Masuda | |
| 2006/0293929 A1 | 12/2006 | Wu | |
| 2007/0012765 A1 | 1/2007 | Trinquet | |
| 2007/0017979 A1* | 1/2007 | Wu | G06Q 30/06 235/382 |
| 2007/0022058 A1 | 1/2007 | Labrou | |
| 2007/0032225 A1 | 2/2007 | Konicek | |
| 2007/0136213 A1 | 6/2007 | Sansone | |
| 2007/0150842 A1 | 6/2007 | Chaudhri | |
| 2007/0156443 A1 | 7/2007 | Gurvey | |
| 2007/0192590 A1 | 8/2007 | Pomerantz | |
| 2007/0215687 A1 | 9/2007 | Waltman | |
| 2007/0260543 A1 | 11/2007 | Chappuis | |
| 2007/0265891 A1 | 11/2007 | Guo | |
| 2007/0271455 A1 | 11/2007 | Nakano | |
| 2007/0273514 A1 | 11/2007 | Winand | |
| 2007/0276944 A1 | 11/2007 | Samovar | |
| 2007/0283049 A1 | 12/2007 | Rakowski | |
| 2007/0288319 A1 | 12/2007 | Robinson | |
| 2008/0007388 A1 | 1/2008 | Au | |
| 2008/0071587 A1 | 3/2008 | Granucci | |
| 2008/0071637 A1 | 3/2008 | Saarinen | |
| 2008/0120127 A1 | 5/2008 | Stoffelsma | |
| 2008/0120186 A1 | 5/2008 | Jokinen | |
| 2008/0154623 A1 | 6/2008 | Derker | |
| 2008/0191009 A1 | 8/2008 | Gressel | |
| 2008/0191909 A1 | 8/2008 | Mak | |
| 2008/0201212 A1 | 8/2008 | Hammad | |
| 2008/0201576 A1 | 8/2008 | Kitagawa | |
| 2008/0201769 A1 | 8/2008 | Finn | |
| 2008/0227518 A1 | 9/2008 | Wiltshire | |
| 2008/0263077 A1 | 10/2008 | Boston | |
| 2008/0288302 A1 | 11/2008 | Daouk | |
| 2008/0308638 A1 | 12/2008 | Hussey | |
| 2009/0055288 A1 | 2/2009 | Nassimi | |
| 2009/0088077 A1 | 4/2009 | Brown | |
| 2009/0125387 A1 | 5/2009 | Mak | |
| 2009/0222900 A1 | 9/2009 | Benaloh | |
| 2009/0284482 A1 | 11/2009 | Chin | |
| 2010/0017872 A1 | 1/2010 | Goertz | |
| 2010/0044444 A1 | 2/2010 | Jain | |
| 2010/0082491 A1 | 4/2010 | Rosenblatt | |
| 2010/0121766 A1 | 5/2010 | Sugaya | |
| 2010/0201536 A1 | 8/2010 | Robertson | |
| 2010/0211452 A1 | 8/2010 | DAngelo | |
| 2010/0219234 A1* | 9/2010 | Forbes | G06Q 10/02 235/375 |
| 2010/0228563 A1 | 9/2010 | Walker, Jr. | |
| 2010/0228576 A1 | 9/2010 | Marti | |
| 2010/0253470 A1 | 10/2010 | Burke | |
| 2010/0268649 A1 | 10/2010 | Roos | |
| 2010/0274691 A1 | 10/2010 | Hammad | |
| 2010/0279610 A1 | 11/2010 | Bjorhn | |
| 2010/0306718 A1 | 12/2010 | Shim | |
| 2010/0308959 A1 | 12/2010 | Schorn | |
| 2010/0322485 A1 | 12/2010 | Riddiford | |
| 2011/0001603 A1 | 1/2011 | Willis | |
| 2011/0040585 A1 | 2/2011 | Roxburgh | |
| 2011/0068165 A1 | 3/2011 | Dabosville | |
| 2011/0078440 A1 | 3/2011 | Feng | |
| 2011/0136472 A1 | 6/2011 | Rector | |
| 2011/0153495 A1 | 6/2011 | Dixon | |
| 2011/0251910 A1 | 10/2011 | Dimmick | |
| 2011/0283241 A1 | 11/2011 | Miller | |
| 2011/0307381 A1 | 12/2011 | Kim | |
| 2012/0006891 A1 | 1/2012 | Zhou | |
| 2012/0030047 A1 | 2/2012 | Fuentes | |
| 2012/0092190 A1 | 4/2012 | Stefik | |
| 2012/0133484 A1 | 5/2012 | Griffin | |
| 2012/0136698 A1 | 5/2012 | Kent | |
| 2012/0166298 A1 | 6/2012 | Smith | |
| 2012/0221474 A1* | 8/2012 | Eicher | G09C 5/00 705/51 |
| 2012/0245769 A1 | 9/2012 | Creissels | |
| 2012/0330697 A1 | 12/2012 | Smith | |
| 2013/0103200 A1 | 4/2013 | Tucker | |
| 2013/0124236 A1 | 5/2013 | Chen | |
| 2013/0194202 A1 | 8/2013 | Moberg | |
| 2013/0201286 A1* | 8/2013 | Schockmel | G07C 9/00111 348/46 |
| 2013/0204647 A1 | 8/2013 | Behun | |
| 2013/0214906 A1* | 8/2013 | Wojak | H04W 4/008 340/10.1 |
| 2013/0279757 A1 | 10/2013 | Kephart | |
| 2013/0307990 A1* | 11/2013 | Wiles | G08B 25/00 348/159 |
| 2013/0325523 A1* | 12/2013 | Huang | G06Q 10/02 705/5 |
| 2014/0025444 A1* | 1/2014 | Willis | G06Q 20/3272 705/13 |
| 2014/0086125 A1 | 3/2014 | Polo | |
| 2014/0100896 A1 | 4/2014 | Du | |
| 2014/0156318 A1 | 6/2014 | Behun | |
| 2014/0186050 A1 | 7/2014 | Oshima | |
| 2014/0279558 A1 | 9/2014 | Kadi | |
| 2015/0025921 A1 | 1/2015 | Smith | |
| 2015/0042451 A1* | 2/2015 | Matsumoto | G01C 21/165 340/5.61 |
| 2015/0084741 A1* | 3/2015 | Bergdale | G07C 9/00119 340/5.61 |
| 2015/0120558 A1* | 4/2015 | Andrews | G07C 9/00571 705/44 |
| 2015/0142483 A1* | 5/2015 | Bergdale | G06Q 10/02 705/5 |
| 2015/0193702 A1* | 7/2015 | Grbavac | G06Q 10/02 705/51 |
| 2015/0206129 A1* | 7/2015 | Perez Lafuente | H04L 63/0807 705/44 |
| 2015/0213443 A1 | 7/2015 | Geffon | |
| 2015/0213660 A1 | 7/2015 | Bergdale | |
| 2015/0294515 A1* | 10/2015 | Bergdale | G07C 9/00103 340/5.61 |
| 2015/0317841 A1* | 11/2015 | Karsch | G07C 9/00174 348/149 |
| 2015/0339599 A1* | 11/2015 | Lee | G06Q 10/02 705/51 |
| 2016/0042333 A1* | 2/2016 | Ho | G06Q 20/18 705/41 |
| 2016/0042631 A1* | 2/2016 | Ho | G07C 9/00007 340/5.32 |
| 2016/0055605 A1 | 2/2016 | Kim | |
| 2016/0093127 A1 | 3/2016 | Evans | |
| 2016/0284183 A1* | 9/2016 | Trani | G07C 9/00174 |
| 2016/0337863 A1* | 11/2016 | Robinson | H04W 12/08 |
| 2017/0017947 A1* | 1/2017 | Robinton | G06Q 20/209 |
| 2017/0055157 A1 | 2/2017 | Bergdale | |
| 2017/0154284 A1* | 6/2017 | Borucki | G06Q 10/02 |

(56) References Cited

U.S. PATENT DOCUMENTS

2017/0221289 A1* 8/2017 Trani ................ G07C 9/00158
2017/0372289 A1 12/2017 Fitzsimmons

FOREIGN PATENT DOCUMENTS

| GB | 2417358 | | 2/2006 |
|----|---------|---|--------|
| JP | 11145952 | A | 5/1999 |
| JP | H11145952 | A | 5/1999 |
| JP | 2003187272 | A | 7/2003 |
| RU | 94931 | | 6/2010 |
| TW | 200825968 | A | 6/2008 |
| WO | 2007139348 | A1 | 12/2007 |
| WO | 2008113355 | | 9/2008 |
| WO | 2009141614 | | 11/2009 |
| WO | 2011044899 | | 4/2011 |
| WO | 2014043810 | | 3/2014 |
| WO | 2014189068 | | 11/2014 |
| WO | 2016105322 | | 6/2016 |

OTHER PUBLICATIONS

Ko Fujimura, Yoshiaki Nakajima, Jun Sekine: "ML Ticket: Generalized Digital Ticket Definition Language" Proceedings of the 3rd Usenix Workshop on Electronic Commerce, Sep. 3, 1998.

Starnberger et al., "QR-TAN: Secure Mobile Transaction Authentication," area, pp. 578-583, 2009 International Conference on Availability, Reliability and Security, 2009.

Scott Boyter, "Aeritas tried to till void until 3G wireless is ready; Mobile boarding pass is just one application being tested", all pages, Dallaw Forth Worth TechBiz, Feb. 19, 2001.

Joanna Elachi, "Lufthansa Debuts Barcode Check-in And Boarding", all pages, CommWeb.com, May 25, 2001.

"Aeritas launches secure wireless check-in with barcode", all pages, m-Travel.com, Nov. 9, 2001.

"Aeritas Launches Wireless Check-in and Security Service", all pages, MBusiness Daily, Nov. 8, 2001.

"New Fast Track Wireless Check-In and Security Solution", all pages, aerias.com, retrieved Feb. 5, 2002.

Hussin, W.H.; Coulton, P; Edwards, R., "Mobile ticketing system employing TrustZone technology" Jul. 11-13, 2005.

Jong-Sik Moon; Sun-Ho Lee; Im-Yeong Lee; Sang-Gu Byeon, "Authentication Protocol Using Authorization Ticket in Mobile Network Service Environment" Aug. 11-13, 2010.

Stephanie Bell, "UK Rail Network to Launch Mobile Train-Ticketing Application" Cardline, Feb. 4, 2011.

Ko Fujimura, Yoshiaki Nakajima, Jun Sekine: "XML Ticket: Generalized Digital Ticket Definition Language" Proceedings of the 3rd Usenix Workshop on Electronic Commerce, Sep. 3, 1998.

Chun-Te Chen; Te Chung Lu, "A mobile ticket validation by VSS teach with timestamp" Mar. 28-31, 2004.

Improvement of urban passenger transport ticketing systems by deploying intelligent transport systems, 2006.

Machine English translation of JP2003-187272A from U.S. Appl. No. 13/901,243.

* cited by examiner

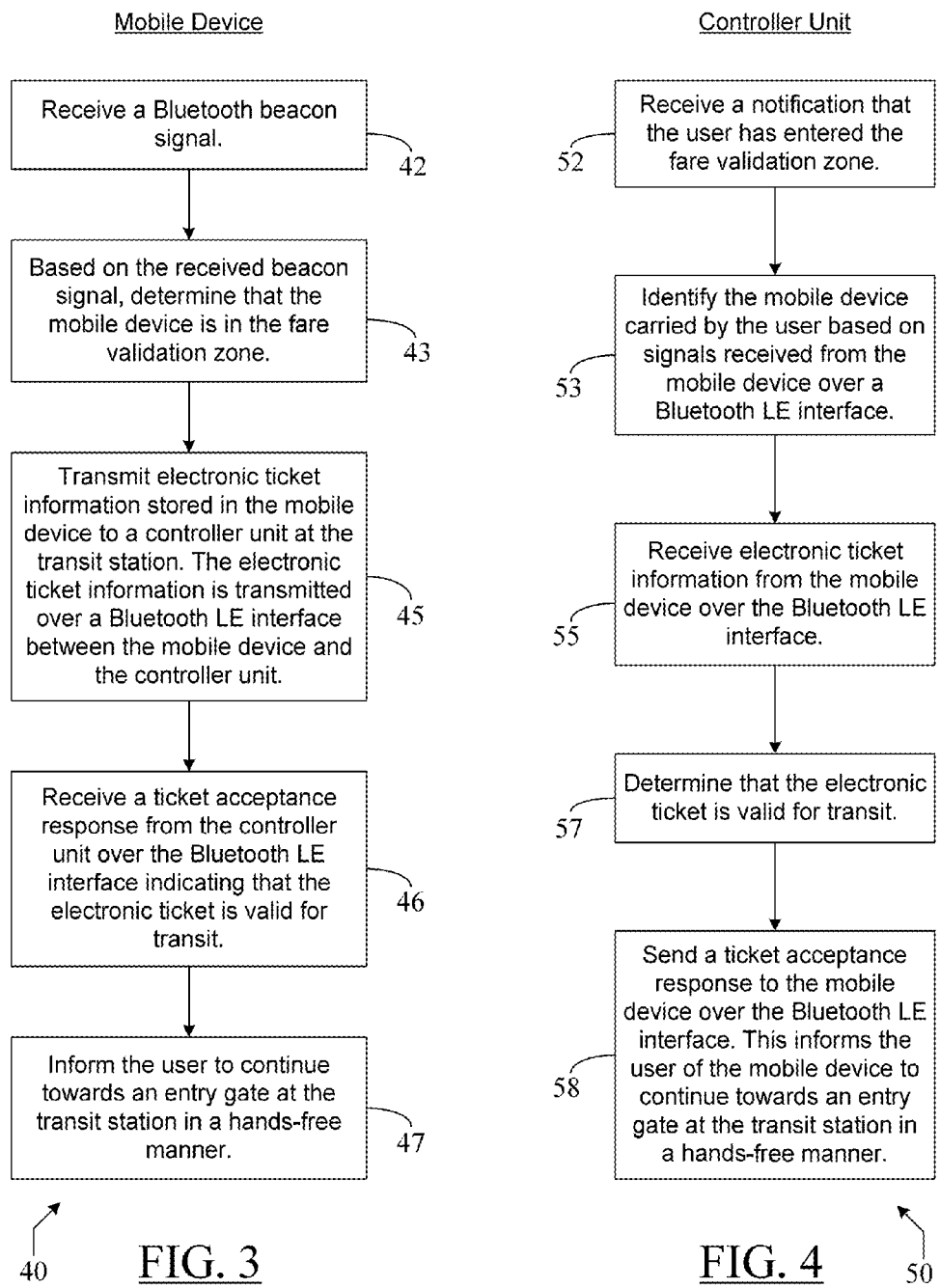

SHORT RANGE WIRELESS TRANSLATION METHODS AND SYSTEMS FOR HANDS-FREE FARE VALIDATION

CROSS-REFERENCE TO RELATED APPLICATIONS

This application claims the priority benefit under 35 U.S.C. § 119(e) of U.S. Provisional Application No. 62/206,196 filed on Aug. 17, 2015, the disclosure of which is incorporated herein by reference in its entirety.

TECHNICAL FIELD

The present disclosure generally relates to automated fare validation at transit stations. More particularly, and not by way of limitation, particular embodiments of the present disclosure are directed to a system and method of hands-free fare validation using Bluetooth® such as, for example, Bluetooth Low Energy (LE).

BACKGROUND

Many transit stations, such as train platforms or bus terminals, routinely employ automatic fare validation (or ticket validation) systems to improve user experience and increase the throughput of passengers through, for example, fare gates to and from the train platforms. Modern technical advances, such as smartcards, two-dimensional (2D) barcodes, and Near Field Communication (NFC) capable mobile devices, have reduced passenger ingress and egress time through fare gates. Smartcards can be either contact or contactless, and can provide personal identification, authentication, data storage, and application processing. NFC-enabled portable devices can be provided with apps, for example, to read electronic tags or make a transaction when connected to an NFC-compliant apparatus.

SUMMARY

Although the above-mentioned technical advances have reduced passenger ingress and egress times through fare gates, passenger throughput is still hampered by passengers having to search for their smartcards or getting out their mobile phones (for example, to establish an NFC contact).

It is therefore desirable to improve the process of automated fare validation and to also improve the passenger throughput through a fare gate at a transit station. It is further desirable to perform ticket validation "hands free."

As a solution, particular embodiments of the present disclosure provide for a hands-free process of automated fare validation. In particular embodiments, the Bluetooth technology may be used in conjunction with a user application on a mobile device to facilitate such hands-free fare validation. In one embodiment, the solution may comprise a mobile app for the passenger and an add-on box that interfaces to a compliant fare gate. Bluetooth beacons may be used to determine a passenger's proximity to the gate and camera-like devices may interface to the add-on box to determine whether a passenger (perhaps without a smartphone) has entered the fare gate. According to particular embodiments of the present disclosure, a user with a valid ticket may simply walk through the fare gate "hands free" without the need to search for a physical ticket or a smartcard or a mobile phone. This hassle-free approach may significantly improve the user experience and passenger throughput through fare gates.

The Bluetooth LE-based automated fare validation system as per teachings of particular embodiments of the present disclosure may detect and provide feedback to the passenger, when the passenger enters into a "Paid Area" with a valid electronic ticket (which may be stored in the passenger's mobile device). A controller as per teachings of the present disclosure may also detect when a passenger, with a mobile ticket previously activated, exits from the Paid Area. Furthermore, in some embodiments, the system may detect, and provide external visual and audio alerts, when a passenger enters into the Paid Area without a valid permit for travel. The system may also detect, and provide external visual and audio alerts, when a passenger attempts to exit from the Paid Area without a valid permit for travel. Overall, passenger throughput into and out of the Paid Area may be increased, especially during peak periods, using the hands-free ticket validation approach disclosed herein.

In one embodiment, the present disclosure is directed to a method in a mobile device to facilitate hands-free fare validation when a user carrying the mobile device approaches a fare validation zone at a transit station. The method comprises: (i) receiving a Bluetooth beacon signal; (ii) based on the received beacon signal, determining that the mobile device is in the fare validation zone; (iii) transmitting electronic ticket information stored in the mobile device to a controller unit at the transit station, wherein the electronic ticket information is transmitted over a Bluetooth interface between the mobile device and the controller unit; (iv) receiving a ticket acceptance response from the controller unit over the Bluetooth interface indicating that the electronic ticket is valid for transit; and (v) informing the user to continue towards an entry gate at the transit station in a hands-free manner. In one embodiment, the Bluetooth interface may be a Bluetooth LE interface.

The mobile device may also determine that it is in proximity to an authorized transmitter of the beacon signal, thereby detecting that the user is present in the fare validation zone.

In one embodiment, the mobile device may receive a beacon Identifier (ID) transmitted using a Bluetooth interface between the mobile device and a transmitter of the beacon ID; identify the received beacon ID; and activate the hands-free fare validation feature in the mobile device based on the identified beacon ID.

In certain embodiments, the mobile device may provide a visible and/or an audible notification of the ticket acceptance. On the other hand, the mobile device may also generate an alert for the user when an electronic ticket stored in the mobile device is invalid or when no electronic ticket is stored in the mobile device.

In another embodiment, the present disclosure is directed to a method to facilitate hands-free fare validation when a user carrying a mobile device approaches a fare validation zone at a transit station. The method comprises performing the following using a controller unit at the transit station: (i) receiving a notification that the user has entered the fare validation zone; (ii) identifying the mobile device carried by the user based on signals received from the mobile device over a Bluetooth interface; (iii) receiving electronic ticket information from the mobile device over the Bluetooth interface; (iv) determining that the electronic ticket is valid for transit; and (v) sending a ticket acceptance response to the mobile device over the Bluetooth interface, thereby informing the user of the mobile device to continue towards an entry gate at the transit station in a hands-free manner. In one embodiment, the Bluetooth interface may be a Bluetooth LE (BLE) interface.

In one embodiment, the controller unit may receive the notification from a digital camera connected to the controller unit.

The controller unit may determine the validity of the electronic ticket by: (i) sending the electronic ticket information received from the mobile device to an entry control gate at the transit station; and (ii) receiving a confirmation message from the entry control gate indicating that the electronic ticket sent by the controller unit is a valid ticket.

In particular embodiments, the controller unit may store various types of information in a memory. Such information may include, for example, operational statistics, a first count of users with valid electronic tickets, a second count of users with invalid electronic tickets, a third count of total number of users entering the transit station, a fourth count of total number of users exiting the transit station, and information about Bluetooth beacon signals transmitted to detect presence of mobile devices in the fare validation zone.

In one embodiment, the controller unit may determine that an electronic ticket received from the mobile device is invalid, and may send a ticket rejection response to the mobile device over the Bluetooth interface, thereby instructing the mobile device to generate an alert for the user.

In a further embodiment, the present disclosure is directed to a mobile device that comprises: (i) a transceiver operable to receive a Bluetooth beacon signal; (ii) a memory for storing program instructions and electronic ticket information; and (iii) a processor coupled to the transceiver and to the memory. In the mobile device, the processor is operable to execute the program instructions, which, when executed by the processor, cause the mobile device to perform the following to facilitate hands-free fare validation when a user carrying the mobile device approaches a fare validation zone at a transit station: (a) based on the received beacon signal, determine that the mobile device is in the fare validation zone; (b) transmit electronic ticket information stored in the memory to a controller unit at the transit station using the transceiver, wherein the electronic ticket information is transmitted by the transceiver over a Bluetooth interface between the mobile device and the controller unit; (c) receive a ticket acceptance response from the controller unit using the transceiver over the Bluetooth interface, wherein the ticket acceptance response indicates that the electronic ticket is valid for transit; and (d) inform the user to continue towards an entry gate at the transit station in a hands-free manner. In one embodiment, the Bluetooth interface may be a BLE interface.

In yet another embodiment, the present disclosure is directed to a controller unit that comprises: (i) an interface unit; (ii) a memory; and (iii) a processor coupled to the interface unit and to the memory. In the controller unit, the interface unit is operable to perform the following: (a) receive a notification that a user has entered a fare validation zone at a transit station, and (b) receive electronic ticket information from a mobile device carried by the user over a Bluetooth interface. In the controller unit, the memory is operable to store program instructions and the electronic ticket information. In the controller unit, the processor is operable to execute the program instructions, which, when executed by the processor, cause the controller unit to perform the following to facilitate hands-free fare validation when the user carrying the mobile device approaches the fare validation zone: (a) identify the mobile device carried by the user based on signals received from the mobile device over the Bluetooth interface, (b) determine that the electronic ticket is valid for transit, and (c) send a ticket acceptance response to the mobile device over the Bluetooth interface using the interface unit, thereby informing the user of the mobile device to continue towards an entry gate at the transit station in a hands-free manner. In one embodiment, the Bluetooth interface may be a BLE interface.

The mobile device and the controller unit may perform various operational aspects briefly mentioned above and further discussed in more detail later below.

Thus, the Bluetooth-based fare validation methodology as per teachings of the present disclosure may improve the passenger throughput through a fare gate by allowing the passenger to simply walk through the fare gate "hands free" so long as they have a valid, active ticket on their mobile device.

BRIEF DESCRIPTION OF THE DRAWINGS

In the following section, the present disclosure will be described with reference to exemplary embodiments illustrated in the figures, in which:

FIG. 3 shows an exemplary flowchart illustrating a mobile device-based hands-free fare validation methodology according to one embodiment of the present disclosure;

FIG. 4 shows an exemplary flowchart illustrating a controller unit-based hands-free fare validation methodology according to one embodiment of the present disclosure;

DETAILED DESCRIPTION

In the following detailed description, numerous specific details are set forth in order to provide a thorough understanding of the disclosure. However, it will be understood by those skilled in the art that the present disclosure may be practiced without these specific details. In other instances, well-known methods, procedures, components and circuits have not been described in detail so as not to obscure the present disclosure.

Reference throughout this specification to "one embodiment" or "an embodiment" means that a particular feature, structure, or characteristic described in connection with the embodiment is included in at least one embodiment of the present disclosure. Thus, the appearances of the phrases in "one embodiment" or in "an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Also, depending on the context of discussion herein, a singular term may include its plural forms and a plural term may include its singular form. Similarly, a hyphenated term (e.g., "hands-free," "hassle-free", etc.) may be occasionally interchangeably used with its non-hyphenated version (e.g., "hands free," "hassle free", etc.), and a capitalized entry (e.g., "Fare Validation Application," "Fare Gate," "Controller Unit," etc.) may be interchangeably used with its non-capitalized version (e.g., "fare validation application," "fare gate," "controller unit," etc.). Such occasional interchangeable uses shall not be considered inconsistent with each other.

It is noted at the outset that the terms "coupled," "operatively coupled," "connected", "connecting," "electrically connected," etc., are used interchangeably herein to generally refer to the condition of being electrically/electronically connected in an operative manner. Similarly, a first entity is considered to be in "communication" with a second entity (or entities) when the first entity electrically sends and/or receives (whether through wireline or wireless means) information signals (whether containing address, data, or control information) to/from the second entity regardless of the type (analog or digital) of those signals. It is further noted that various figures (including component diagrams) shown and discussed herein are for illustrative purpose only, and are not drawn to scale.

The terms "first," "second," etc., as used herein, are used as labels for nouns that they precede, and do not imply any type of ordering (e.g., spatial, temporal, logical, etc.) unless explicitly defined as such.

Figure 1:
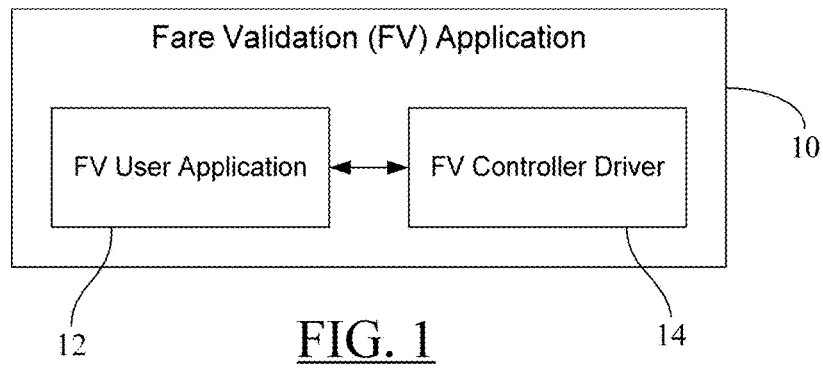
FIG. 1 illustrates constituent components of a Fare Validation (FV) application according to an exemplary embodiment of the present disclosure.

FIG. 1 illustrates constituent components of a Fare Validation (FV) application 10 according to an exemplary embodiment of the present disclosure. The FV application 10 may be a software module having various distributed data processing functionalities discussed later below with reference to FIGS. 2-8. Some portion of data processing or computations may be performed locally in a mobile device whereas some other portion of data processing may be performed on a controller unit. The FV application 10 according to one embodiment of the present disclosure may include an FV User Application (user app) component 12 and an FV Controller Driver component (controller driver) 14. The user app and controller driver components may be in bi-directional communication (preferably wireless, as discussed below with reference to FIG. 2) with each other, and may together provide the hands-free fare validation functionality as discussed later below. It is noted here that, for ease of discussion, a computer software, program code or module may be referred to as "performing," "accomplishing," or "carrying out" a function or process. However, it is evident to one skilled in the art that such performance may be technically accomplished by a processor when the software or program code is executed by the processor. The program execution would cause the processor to perform the tasks or steps instructed by the software to accomplish the desired functionality or result. However, for the sake of convenience, in the discussion below, a processor or software component may be referred to interchangeably as an "actor" performing the task or action described, without technically dissecting the underlying software execution mechanism.

Figure 2:
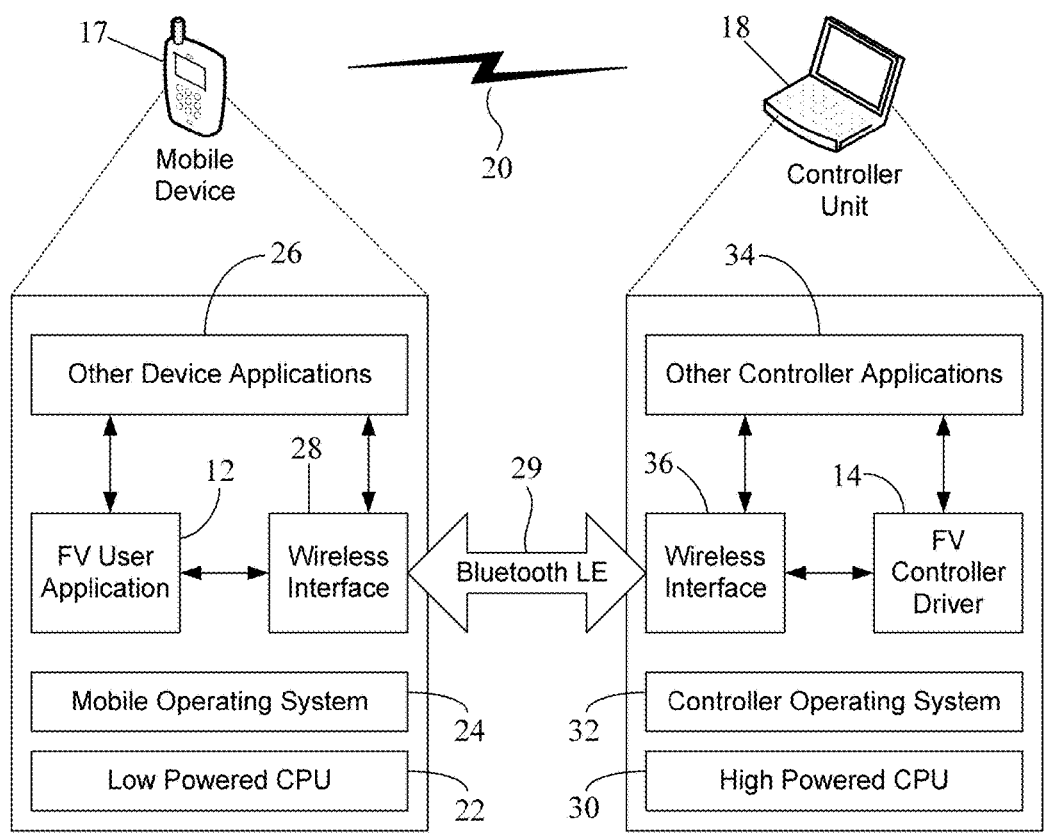
FIG. 2 depicts an exemplary system for implementing the FV application according to one embodiment of the present disclosure.

FIG. 2 depicts an exemplary system 16 for implementing the FV application 10 according to one embodiment of the present disclosure. The system 16 may include a mobile device 17 that is in wireless communication with a controller unit 18, as symbolically illustrated by a wireless link 20. As discussed later below, the wireless link 20 may be a Bluetooth-based communication interface. The FV user app 12 may reside in the mobile device 17, whereas the FV controller driver 14 may reside at the controller unit 18 as shown in FIG. 2. It is noted here that the terms "mobile device," "mobile handset," "wireless handset," and "User Equipment (UE)" may be used interchangeably hereinbelow to refer to a wireless communication device that is capable of voice and/or data communication. Some examples of such mobile handsets include cellular telephones or data transfer equipments, tablets, and smartphones (e.g., iPhone™, Android™, Blackberry™, etc.). It is observed here that, for ease of discussion, the controller unit 18 is shown as a separate device or apparatus. However, the controller unit 18 may not have to be a separate computing unit (in hardware or software form) dedicated to carry out the fare validation functionality. In one embodiment, the functionality of the controller unit 18 may be implemented in an already-existing physical computing/data processing unit or (non-physical) server software (not shown) at a transit station.

As shown in FIG. 2, the UE 17 may include, inside its housing (not shown), a relatively low-powered Central Processing Unit (CPU) 22 executing a mobile operating system (or mobile OS) 24 (e.g., Symbian™ OS, Palm™ OS, Windows Mobile™, Android™, Apple iOS™ etc.). Because of the battery-powered nature of mobile handsets, the CPU 22 may be designed to conserve battery power and, hence, may not be as powerful as a full-functional computer or server CPU. As further shown in FIG. 2, in addition to the user app 12, the UE 17 may also have one or more mobile applications 26 resident therein. These mobile applications 26 are software modules that may have been pre-packaged with the handset 17 or may have been downloaded by a user into the memory (not shown) of the UE 17. Some mobile applications 26 may be more user-interactive applications (e.g., a mobile game of chess to be played on the UE 17, a face recognition program to be executed by UE 17, etc.), whereas some other mobile applications may be significantly less user-interactive in nature (e.g., UE presence or location tracking applications, a ticketing application). The mobile applications 26 as well as the user app 12 may be executed by the processor 22 under the control of the mobile operating system 24. As also shown in FIG. 2, the UE 17 may further include a wireless interface unit 28 to facilitate UE's wireless communication with the controller unit 18 (discussed later) via a Bluetooth interface such as, for example, a Bluetooth LE (or Bluetooth) interface 29. In particular embodiments, the wireless interface unit 28 may also support other types of wireless connections such as, for example, a cellular network connection, a Wi-Fi connection, and the like. The applications 12, 26 may utilize the wireless interface 28 as needed.

It is noted here that the Bluetooth LE interface 29 is shown by way of an example only; the teachings of the present disclosure are not limited to a BLE interface alone. Thus, although the discussion below may frequently refer to a BLE interface, it is understood that such discussion remains applicable to other Bluetooth technologies as well, such as, for example, the Bluetooth technologies that comply with one or more Bluetooth Special Interest Group (SIG) standards. The hands-free fare validation solution as per teachings of the present disclosure may be implemented using a number of Bluetooth specifications, including BLE. Hence, the usage of the terms "BLE" or "Bluetooth LE" in the discussion below should be considered as a representative of (and inclusive of) the more general term "Bluetooth" or other non-BLE based Bluetooth technologies. Additionally, in certain embodiments, the Bluetooth-based proximity detection discussed below may be modified such that proximity may be detected using Bluetooth in conjunction with WiFi and/or cellular data connections, or some combination thereof. Thus, for example, a hybrid approach to proximity detection may use both WiFi and Bluetooth to detect where a person is at. The Bluetooth-based discussion below encompasses such variations and combinations, but each such hybrid approach is not discussed in detail for the sake of brevity.

In the embodiment of FIG. 2, the controller unit 18 is shown to include a relatively high powered CPU 30 executing an operating system 32 (e.g., Windows™, Mac™ OSX, Linux, etc.). In addition to the controller driver 14, the controller unit 18 may also store in its memory (not shown) other controller-specific applications 34 such as, for example, an application that facilitates NFC or Ethernet-based communication with an entry gate system (discussed later with reference to FIG. 5), an application that facilitates communication with a "people counting" device (also discussed later), an application that interacts with a backend system, and the like. The controller 18 may wirelessly communicate with the UE 17 via its own wireless interface unit 36. The interface units 28, 36 may wirelessly transfer data or information between the mobile device 17 and the controller 18 using the Bluetooth interface 29 as shown. Thus, in operation, a UE-generated signal may be wirelessly sent (using the wireless interface 28) over the Bluetooth interface 29 to the controller unit 18 for further processing by its CPU 30. Any response or other signal from the controller unit 18 can be provided in the UE-recognized wireless format by the controller's wireless interface unit 36 and eventually delivered to UE's wireless interface 28 (and, hence, to the UE's processor 22 for further processing) via the Bluetooth interface 29. The resulting wireless "link" between the interfaces 28 and 36 is symbolically illustrated by the bi-directional arrow 29. In particular embodiments, the wireless interface unit 36 may also support other types of wireless connections such as, for example, a cellular network connection, a Wi-Fi connection, and the like. The applications 14, 34 may utilize the wireless interface 36 as needed. It is observed here that, in particular embodiments, the mobile device 17 and/or the controller unit 18 may be coupled to other networks (not shown) via a wired or wireless connection (whether circuit-switched or packet-switched). Such networks may be voice networks, data networks, or both, and may include, for example, a cellular network, the Internet, a Local Area Network (LAN), a Public Land Mobile Network (PLMN), and the like.

FIG. 3 shows an exemplary flowchart 40 illustrating a mobile device-based hands-free fare validation methodology according to one embodiment of the present disclosure. Various operational tasks shown in FIG. 3 may be performed by the mobile device 17 when the user app 12 (and other relevant program code) is executed by the CPU 22. Initially, the mobile device 17 may receive a Bluetooth beacon signal (block 42). As discussed later, specific Bluetooth beacon signals may be transmitted as per teachings of the present disclosure for locating the presence of a passenger in the fare validation zone (also referred to below as "fare gate trigger zone"). Thus, based on the received beacon signal, the mobile device 17 may determine that it is in the fare validation zone (block 43). At block 45, the mobile device 17 may transmit electronic ticket information stored in the mobile device (as discussed later below) to a controller unit, such as the controller unit 18, at the transit station. The electronic ticket information may be transmitted over a Bluetooth interface, such as the Bluetooth LE interface 29 between the mobile device 17 and the controller unit 18. At block 46, the mobile device 17 may receive a ticket acceptance response from the controller unit 18 over the Bluetooth interface 29 indicating that the electronic ticket is valid for transit. In response, at block 47, the mobile device 17 may inform the user/passenger—for example, via a visible and/or an audible notification—to continue towards an entry gate at the transit station in a hands-free manner. Thus, the ticket submission and ticket validation operations may be performed without user involvement; a passenger is not required to search for their smartcards or mobile phones to validate their tickets.

FIG. 4 shows an exemplary flowchart 50 illustrating a controller unit-based hands-free fare validation methodology according to one embodiment of the present disclosure. Various operational tasks shown in FIG. 4 may be performed by the controller unit 18 when the controller driver 14 (and other relevant program code) is executed by the CPU 30. Initially, at block 52, the controller unit 18 may receive a notification that the user has entered the fare validation zone. In one embodiment, such notification may be received from a "people counting" device such as, for example, a digital camera, connected to the controller unit 18 as discussed later with reference to FIG. 5. At block 53, the controller unit 18 may identify the mobile device carried by the user—such as the mobile device 17—based on the signals received from the mobile device over a Bluetooth interface, such as the Bluetooth LE interface 29. Upon identifying the mobile device 17 and establishing a Bluetooth communication link with it, the controller unit 18 may receive electronic ticket information from the mobile device 17 over the Bluetooth interface 29 (block 55). At block 57, the controller unit 18 may determine that the electronic ticket is valid for transit. As discussed later, in one embodiment, the controller unit 18 may send the electronic ticket information to an entry control gate at the transit station to check the validity of the ticket. If the submitted ticket is valid and active, the controller unit 18 may receive a confirmation message from the entry control gate. At block 58, the controller unit 18 may sent a ticket acceptance response to the mobile device 17 over the Bluetooth interface 29. This informs the user/passenger (carrying the mobile device 17) to continue towards an entry gate at the transit station in a hands-free manner. In other words, a passenger is not required to search for his/her smartcard or mobile phone to validate his/her ticket; the passenger can simply continue walking towards the entry gate because of the hands-free validation of the ticket through the interactions between the controller unit 18 and the passenger's mobile device 17.

Figure 5:
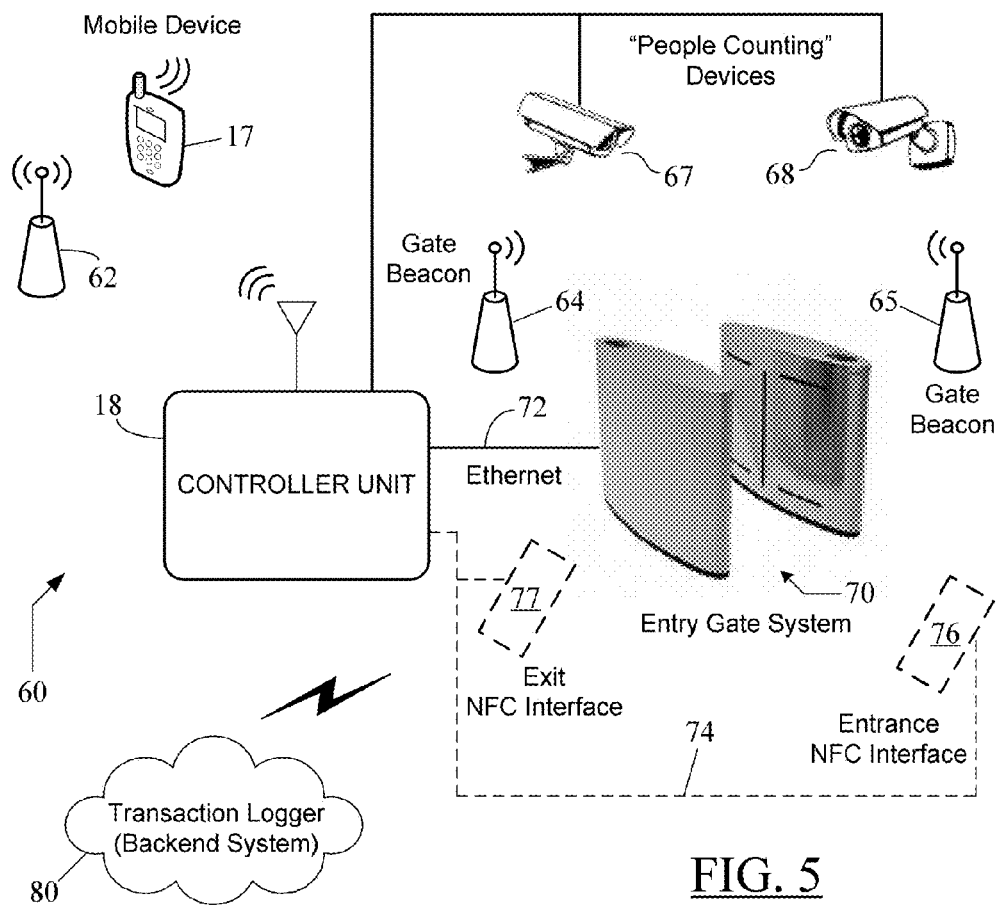
FIG. 5 shows an exemplary illustration of system components to implement the hands-free fare validation methodology at a transit station according to one embodiment of the present disclosure.

FIG. 5 shows an exemplary illustration of system components to implement the hands-free fare validation methodology at a transit station 60 according to one embodiment of the present disclosure. Prior to discussing the operational aspects of the system components in FIG. 5, a brief overview of exemplary hardware features of these components is provided.

In particular embodiments, the mobile device 17 may be an Apple® iPhone 6 or a newer model. In other embodiments, the mobile device 17 may be a Google® Nexus 5 or similar model. In any event, the user app 12 may be configured to run on a variety of mobile devices—Android-based, Apple iOS-based, or any other mobile operating system-based. In particular embodiments, the mobile device 17 may support downloadable applications and Bluetooth LE 4.2 or higher protocols (or other applicable Bluetooth protocols) for communications, including Bluetooth Beacon scanning. The mobile device 17 may include a User Interface (UI) to facilitate various tasks in support of the hands-free fare validation. Such tasks may include, for example, purchase of an electronic ticket by the user, selection of the desired ticket from a group of pre-purchased tickets, intimation of acceptance of the electronic ticket for transit, and the like.

In particular embodiments, the controller unit 18 may be a computer such as, for example, a laptop or a desktop computer, a mobile device, a tablet computer, a single-board computer, or a modular controller such as a Raspberry Pi™ or Arduino™ unit. The controller unit 18 may support some or all of the following capabilities: a Bluetooth (including BLE) based radio communication, wired or wireless connectivity, Universal Serial Bus (USB) connectivity, non-volatile storage such as flash or disk storage, volatile storage using Random Access Memory (RAM) modules, Bluetooth LE 4.0 or higher stack (or other applicable Bluetooth protocols), video or Liquid Crystal Display (LCD) display, NFC reader, and a data input device such as a keyboard. It is noted here that, in certain embodiments, there may be more than one controller unit 18 installed at the transit station 60, such as, for example, when multiple fare gates (discussed below) are present and "managed" by different controller units or when multiple wake-up beacons (discussed below) are associated with different controller units. Generally, the number of controller units or beacon transmitters (wake-up beacons or gate beacons) may be implementation-specific.

The transit station 60 may optionally employ one or more Wake-Up beacon transmitters 62 for launching and preparing the user app 12 on the mobile device 17 for proximity tracking. The number of wake-up beacons 62 may be based upon field conditions. In particular embodiments, the wake-up beacon 62 may provide Bluetooth LE (BLE) (or other type of Bluetooth) beacon signals using an omnidirectional antenna (not shown). The beacon signals transmitted by the transmitter 62 may be compatible with proprietary Bluetooth beacon standards such as, for example, the iBeacon standard for Apple® systems and similar Bluetooth beacon standards for Android™ systems. Thus, for iBeacon compatibility, for example, the wake-up beacon transmitter 62 may be capable of advertising a programmable 16-byte Universal Unique Identifier (UUID) along with a 2-byte Major Number and a 2-byte Minor Number. The UUID may be used to uniquely identify an object—for example, the beacon transmitter 62—across the internet. The 16-bit Major Number may further subdivide iBeacons that have the same UUID. The 16-bit Minor Number may further subdivide iBeacons within the same Major Number.

As noted above, a UUID is a unique number. With regard to BLE, each service may be represented by a UUID. The 16-bit standardized BLE UUIDs allow for 65536 unique services. BLE also supports 128 bit UUID numbers for custom services. A "service" can be almost anything such as, for example, a heart monitor, a proximity sensor, a temperature probe, and so on. Additional information about UUIDs for various "services" may be obtained at https://developer.bluetooth.org/gatt/services/Pages/ServiceHome.aspx. Although UUIDs are normally fixed, they may be dynamic in certain implementations.

The wake-up transmitter 62 may be considered a "Bluetooth Beacon" because it periodically transmits a fixed message—a Beacon Identifier (ID)—using Bluetooth or Bluetooth LE. In particular embodiments, a Bluetooth Beacon is usually incapable of receiving data. The Beacon ID may provide transmitter-specific identification information that the mobile operating system 24 may use to recognize the Bluetooth Beacon. For iBeacons, for example, the Beacon ID is the UUID along with the major and minor numbers. It is observed here that the Bluetooth LE (also referred to as "Bluetooth Smart") is a wireless communication protocol that permits short range (up to 30 meters) communications. Bluetooth LE functionality is found on many smartphones and tablets.

The beacons may be used for determining proximity of a mobile device to a particular location. Each beacons normally has a fixed ID, but, in certain implementations, a beacon can have a dynamic ID. With regard to Beacon IDs, the mobile device may read all of the beacon IDs transmitted in its vicinity. In certain embodiments, the beacon data (such as Beacon ID), signal strength of the received beacon, and a timestamp value (associated with the received beacon) may be forwarded—such as, for example, by the user app 12—over WiFi to another computer or host—such as, for example, the controller unit 18—that determines the location of the mobile device 17. Thus, in particular embodiments, the user app 12 in the mobile device 17 may "listen" to the beacons and then connect over WiFi to an application—such as, for example, the controller driver 14—that determines location. In some other embodiments, the user app 12 may connect to a different application to determine the location or may itself determine the location and send the location information to the controller driver 14. Major beacon formats are supported by iOS™, Android™, and other mobile operating systems.

Figure 6:
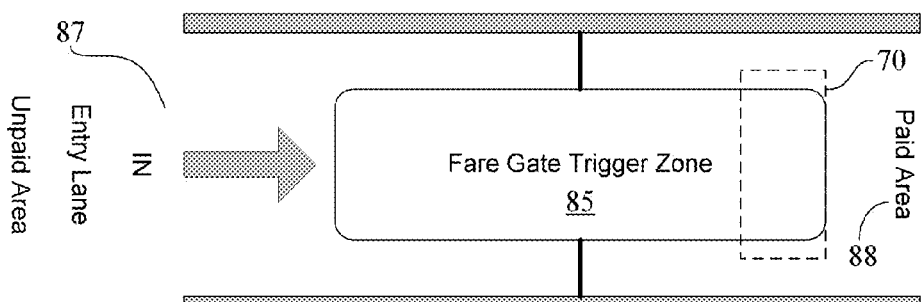
FIG. 6 is a simplified illustration of a fare validation zone (or a fare gate trigger zone) according to one embodiment of the present disclosure.

The transit station 60 may also employ two or more BLE (or other type of Bluetooth) Gate Beacons for locating a passenger in the Fare Gate Trigger Zone (also referred to as the "fare validation zone"). An exemplary fare gate trigger zone 85 is shown in FIG. 6 (discussed below). In FIG. 5, two Gate Beacons are shown using reference numerals "64" and "65". Based upon the field conditions or to improve accuracy, more gate beacons may be installed as well. Operationally, the gate beacons 64-65 are also Bluetooth Beacons and may be similar to the wake-up beacon 62, except that each gate beacon 64-65 may have a highly unidirectional external antenna (not shown) to specifically "track" the passengers who are present in the fare validation zone.

In one embodiment, all Bluetooth® communications between various entities in FIG. 5 may conform to the standards set forth in the Bluetooth® Core Specification 4.2.

The transit station 60 may have a number of "people counting" devices 67-68 to determine when a person has entered the fare validation zone. In one embodiment, the "people counting" devices may include stereoscopic digital Infrared (IR) cameras. In some embodiments, the cameras 67-68 may be wirelessly connected to the controller unit 18 to notify the controller 18 when a person has entered the fare validation zone. In other embodiments, there may be an Ethernet-based connectivity between the controller unit 18 and the "people counting" devices 67-68. Furthermore, to prevent "tailgating," the devices 67-68 may be configured to distinguish between one person and more than one person in the fare gate trigger zone.

An entry gate system 70 (also referred to herein as a "Fare Gate") may be deployed at the transit station 60 to function as an electronically-controlled access barrier. One fare gate is shown in FIG. 5 by way of an example. Many transit stations may have multiple such fare gates. In one embodiment, a fare gate may be a physical access barrier that is intended to permit only properly-ticketed passengers through into the "Paid Area," which may be a secured area that is designated for paying passengers. In one embodiment, the fare gate 70 may be directly connected to the controller unit 18 via an Ethernet interface 72. In some embodiments, a standard Power Over Ethernet (POE) switch (or hub) may be used to facilitate multiple Ethernet connections or field conditions. A standard RJ-45 connector may be used to provide the Ethernet-based network connectivity between the controller unit 18 and the fare gate 70. In certain embodiments, the fare gate may be a virtual barrier, such as, for example, in case of a bus where such a virtual barrier may be used in conjunction with a controller unit as per teachings of the present disclosure to afford hands-free entry to the passengers wishing to board the bus. In other words, the physical barrier-based illustration in FIG. 5 is exemplary only; the teachings of the present disclosure are not limited to a physical gate barrier being present.

On the other hand, in some embodiments, the controller unit 18 may use an NFC interface 74 to initiate a transaction with the fare gate 70. However, as noted before, an NFC interface may not support a fully hands-free transaction. An NFC interface may be primarily used where, for business or technical reasons, a fare gate that supports NFC cannot be easily modified to support direct connectivity with the controller unit 18 for completely hands-free fare validation. Thus, if the fare gate can be modified to support direct transaction initiation via another interface—such as, for example, an Ethernet based LAN—then the NFC interface may be eliminated. Hence, the NFC interface 74 is shown dotted in FIG. 5. It is observed that, in particular embodiments, there may be two NFC interfaces associated with the entry gate system 70—an NFC interface 76 at the entrance of the "Paid Area" and an NFC interface 77 at the exit from the "Paid Area." In one embodiment, the Radio Frequency (RF) protocol between the NFC interface 74 and the fare gate 70 may be ISO (International Standards Organization) 14443-2 compliant. More generally, the ISO 14443-2 standard defines the RF communications between RFID based devices such as contactless smartcards and another device (such as a fare gate).

On the hardware side, the fare gate 70 may include a fare gate controller (not shown), which may be a microcontroller with appropriate logic to act as a fare gate. In one embodiment, the fare gate 70 may include some of all of the following: memory to store the control program and associated data; an NFC reader/writer; other media readers (optional); an Ethernet network hub or switch; a local display (LCD or similar) for each side—entry and exit; speaker(s); and remote display capability. Furthermore, in certain embodiments, the fare gate 70 may have an "Enter" indicator on its entry side and a "Don't Enter" indicator on its exit side.

Although not shown in FIG. 5, the transit station 60 may also have one or more remote displays—for example, displays hanging over the fare gate entrance and exit. When passengers are moving quickly through a fare gate, these displays provide visual feedback to the users, such as, for example, a confirmation that their electronic ticket is valid and accepted and, hence, they should continue moving to the transit terminal or "Paid Area." In particular embodiments, these remote displays may serve a user interfaces to allow the fare gate to indicate both normal and exceptional operating conditions to passengers and station personnel. For example, the remote display may have the ability to display a message when there is a valid transaction and accompany the message with a "valid transaction" sound. Similarly, the fare gate-affiliated user interface may have the ability to display a message when there is an invalid transaction attempt (such as, for example, submission of an invalid or expired ticket) and accompany the message with an "invalid transaction" sound. In some embodiments, the remote displays may have the ability to indicate the direction in which the fare gate is operating. For example, an "Entry" gate may have a red indicator visible from the "Paid Area" side and a blue or green indicator may be visible from the "Unpaid Area" side. The "paid" and "unpaid" areas are shown in the exemplary illustration of FIG. 6.

In the embodiment of FIG. 5, a transaction logger or backend system 80 is shown to be in wireless communication with the entry gate system 70. In one embodiment, the backend system 80 may be a proprietary data processing system owned, operated, maintained, or controlled by the relevant transit authority or by the operator of the fare gate 70 at the transit station 60. Various transactions and events (discussed later) may be logged in the transaction logger 80, for example, for statistical analysis, record-keeping, and Operations and Maintenance (O&M) activity. In certain embodiments, the entry gate system 70 may communicate with the back-end system 80 using a wired connection.

In particular embodiments, the FV user app 12 installed in the mobile device 17 may support two modes of operation: (i) a Mobile Ticketing mode, and (ii) a Fare Gate Transaction mode. The system designer may determine whether the functionality offered by these modes is accessible from the same screen or requires selection of a menu item or clicking on an appropriate radio button from the choices presented on the display screen of the mobile device 17.

In the mobile ticketing mode, the user app 12 may allow the user of the mobile device 17 to select and purchase a wide range of ticket types to numerous destinations using a mobile ticketing application provided by, for example, the transit station operator or train/bus service operating company. The user app 12 may further allow the user to see which transport tickets are electronically stored on the user's mobile device 17. The user may initially have to deploy the mobile ticketing app on his/her mobile device 17 to avail of the electronic ticketing functionality. A user interface may be provided to enable the user to select and add a valid electronic ticket to the inventory of tickets stored on the device 17. The user may also pay for the selected ticket online and the transit service (for example, train service or bus service) operator may confirm the purchase with a unique code, digital coupon, or electronic ticket itself. In one embodiment, any of these forms of "receipt" of purchase may be later used by the mobile device 17 for hands-free fare validation. The user may enter the mobile ticketing mode via an appropriate menu selection. Once in the ticketing mode, the user may press a corresponding on-screen/off-screen button for adding a ticket and the displayed count of valid tickets increases by one. In certain embodiments, the user may need to setup an online account with the transit service operator for automatic billing and payment facility, as well as for recurring ticket purchases. For the sake of present discussion, additional details of ticket generation, purchase, and delivery are not relevant and, hence, such details are not provided.

In the fare gate transaction mode, the user app 12 may allow the user to "tender" and activate a valid electronic ticket (stored on the mobile device 17) by simply passing through the entry gate (fare gate) system 70. Thus, the fare gate transaction mode may facilitate hands-free fare validation. In one embodiment, if the user account information is stored in a remote Host Operator or Processing System (HOPS), such as, for example, the backend system 80 in FIG. 5, and if Internet-connectivity is available near the fare gate area, the user app 12 may retrieve such information from the remote host and make it available to the fare gate 70 through communication with the controller driver 14 in the controller unit 18. However, if online connection to the remote host is not possible, the user app 12 may still provide hands-free fare validation as discussed below.

In one embodiment, the user may activate the user app 12 on the user's mobile device 17 prior to or at the time of entering/approaching the transit station 60. The user app 12 may then configure the mobile device 17 to enable scanning for Bluetooth beacons transmitted by the weak-up beacon 62. The user app 12 may then identify those Bluetooth beacons that have a specific UUID or other recognizable Beacon ID to, for example, ascertain that the received beacon signal is from an authorized Bluetooth transmitter and, hence, to conclude that the user device 17 is in the proximity of the authorized transmitter and, hence, near the fare validation zone. In one embodiment, based on the identified beacon ID (received from the wake-up beacon 62), the user app 12 may activate the hands-free fare validation feature in the mobile device 17. In response to determining that the mobile device 17 is in or near the fare gate trigger zone (the fare validation zone), the user app 12 may configure the mobile device 17 to send binary data of a specified size to the FV controller driver 14 in the controller unit 18. The size of the transmitted data may be based on the Bluetooth LE (or other Bluetooth) protocol used to communicate with the controller driver 14. The binary data may be used to send requests to the controller driver 14 to perform specific operations such as, for example, electronic ticket validation with the fare gate 70. The user app 12 may also receive binary data of a specified size from the controller driver 14. Such data may include, for example, a ticket confirmation/acceptance message or an invalid ticket/rejection message. When a ticket is accepted by the fare gate, the user app 12 may update the ticket information stored on the mobile device 17 to indicate that the specified ticket has been used. The user app 12 may also send a log message to the controller driver 14, for example, to enable the driver 14 to keep a count of number of users with valid or invalid electronic tickets. More generally, the user app 12 may be able to open and close a Bluetooth (or BLE) communication session with the controller deriver 14, as needed.

In one embodiment, the user app 12 may display a message or other visible notification on the mobile device 17 to inform the user that the user's electronic ticket has been accepted or rejected, as applicable. Instead of or in addition to such visible notification, the user app 12 may also provide an audible notification—such as, for example, play a valid transaction sound or an error sound—to the user through the mobile device 17. The error sound may be specifically associated with an error condition, such as, for example, an invalid/expired ticket or no electronic ticket stored in the mobile device 17.

In particular embodiments, the FV controller driver 14 installed in the controller unit 18 also may support two modes of operation: (i) a Transit Control mode, and (ii) a Maintenance mode. A system administrator or other transit service employee may be allowed to place the controller unit 18 in the appropriate mode of operation. In certain embodiments, the maintenance mode may be omitted.

In the transit control mode, the controller driver 14 may configure the controller unit 18 to initiate a ticket transaction with the fare gate 70, and obtain a transaction response from the fare gate. As part of the fare validation transaction, the controller driver 14 may be able to detect the entry of a passenger into the fare validation zone. In one embodiment, the driver 14 may also detect the exit of a passenger from the fare gate trigger zone. In one embodiment, such entry and exit may be determined based on information received from the "people counting" devices 67-68. Furthermore, the controller driver 14 may be able to identify the mobile device that has entered the fare gate trigger zone (and the device's proximity to the fare gate) based on the signals received from the mobile device over the Bluetooth interface 29 (FIG. 2). In response, the driver 14 may send binary data to the mobile device-based user app and also receive binary data from the user app—such as the user app 12 operational on the mobile device 17. As noted before, the binary data received from the mobile device 17 may include electronic ticket information, which the controller driver 14 may send to the fare gate system 70 for validation. Upon receiving a confirmation message from the entry gate system 70, the controller driver 14 may send a ticket acceptance response to the user app 12 over the Bluetooth interface 29, thereby informing the user of the mobile device 17 that the electronic ticket is valid for transit and the user may continue proceeding towards the entry gate 70 in a hands-free manner. On the other hand, if the submitted ticket is not accepted by the fare gate 70—for example, if the ticket is invalid or expired, the controller driver 14 may send a ticket rejection message to the user app 12 over the Bluetooth interface 29, thereby instructing the mobile device 17 to generate an alert for the user. In one embodiment, after validating or rejecting an electronic ticket, the controller driver 14 may close the existing communication session with the mobile device 17.

The controller driver 14 may be configured to store a log message for every transit control-related transaction it performs and the log data may be stored either locally in the controller unit 18 or remotely, for example, in the transaction logging system 80 (FIG. 5), subject to device storage constraints.

In the maintenance mode, the controller driver 14 may gather statistics to help improve the fare validation methodology or to aid administrators or service personnel from the transit company in their implementation of the fare validation approach. In the maintenance mode, the controller driver 14 may provide two sub-modes of operation: (i) Display Current Activity: This sub-mode allows display of the incoming data; and (ii) Display Statistics: This sub-mode allows display of statistics associated with the usage of the fare validation methodology as per particular embodiments of the present disclosure.

When a registered beacon is detected by the user app 12, it may share the Beacon ID and the mobile device's proximity information with the controller driver 14. In the Display Current Activity sub-mode, the controller driver 14 may display the Beacon ID and the proximity information. In one embodiment, the driver 14 may also log the Beacon information. In another embodiment, the driver 14 may disable such logging. Thus, when Beacon logging has been enabled and a registered beacon is detected, the Beacon ID and proximity information may be logged either locally or remotely, subject to device storage constraints.

To aid the transit service administrators, the controller driver 14 may keep statistics in any mode of operation. However, in particular embodiments, the statistics may be displayed only when in the Display Statistic sub-mode. The statistical information that may be displayed include, for example: (i) operational statistics, (ii) a count of the number of passengers entering through the fare gate into the "Paid Area" with a valid ticket while in the "Open Gate" mode (discussed later), (iii) a count of the number of passengers entering through the fare gate into the "Paid Area" with a valid ticket while in the "Closed Gate" mode (discussed later), (iv) a count of the number of passengers entering through the fare gate into the "Paid Area" without a valid ticket while in the "Open Gate" mode, (v) a count of the number of passengers entering through the fare gate into the "Paid Area" without a valid ticket while in the "Closed Gate" mode, (vi) a count of the number of passengers exiting through the fare gate into the "Unpaid Area" while in the "Open Gate" mode, and (vii) a count of the number of passengers exiting through the fare gate into the "Unpaid Area" while in the "Closed Gate" mode. All statistical counts may be reset to zero.

It is observed here that the fare gate 70 may be setup either has an "Entry" gate or an "Exit" gate. Thus, the maintenance personnel may need to indicate the "direction" of the fare gate (for example, an "Entry" gate or an "Exit" gate) to the controller driver 14. Furthermore, in certain embodiments, the maintenance personnel may also need to specify to the controller driver 14 whether the fare gate 70 is operating in the "Open Gate" mode or the "Closed Gate" mode.

FIG. 6 is a simplified illustration of a fare validation zone (also referred to herein as a "fare gate trigger zone") 85 according to one embodiment of the present disclosure. Broadly, the fare validation zone 85 may refer to the area within or near the fare gate 70 where the presence of the mobile device 17 indicates its user's intent to pay a fare and proceed to the actual transit terminal. By way of an illustration, the fare gate 70 is shown as a dotted block in FIG. 6. As shown in the exemplary illustration of FIG. 6, a user may approach the fare gate trigger zone 85 from an entry lane or "Unpaid Area" 87 at the transit station 60 (FIG. 5). An "unpaid area" may be an unsecured area of the transit station 60 where normal non-paying pedestrian traffic occurs. In contrast, when a user's electronic ticket submission is accepted by the fare gate system 70 as discussed before, the user may transition to a "Paid Area" 88 at the station 60. From the "paid area," the user may proceed to boarding the appropriate transit service (for example, a train or a bus).

The fare gate 70 may be operated in an "open gate" mode or in a "closed gate" mode. In the "open gate" mode, the fare gate 70 may be a barrier-less system. For example, during peak hours when the passenger volume warrants the presence of inspectors (or other service personnel) at the transit station 60, the fare gate (physical) barriers may be left open and the passengers may pass through the gates quickly in a single file. A remote sign for each fare gate may display a message, accompanied by an audible alert, informing the user and the inspectors should the user not have a valid or detectable ticket. However, during off-peak times when the availability of inspectors is decreased and the passenger volume does not hinder throughput, the fare gate barriers may be closed (or brought back in their place), thereby operating the fare gate 70 in the "closed gate" mode.

In certain embodiments, there may be four different transit situations: (1) A user enters the "paid area" 88 when the fare gate 70 is in the "open gate" mode, (2) a user enters the "paid area" 88 when the fare gate 70 is in the "closed gate" mode, (3) a user exits from the "paid area" 88 when the fare gate 70 is in the "open gate" mode, and (4) a user exits from the "paid area" 88 when the fare gate 70 is in the "closed gate" mode. Various operations discussed below with reference to these transit situations are exemplary in nature, and may be accomplished through interaction between the mobile device-based FV user app 12 and the controller unit-based FV controller driver 14, as well as the controller driver's further interaction with other devices/systems—such as, for example, the "people counting" devices, the entry gate system, and the like—at the transit station 60. In view of the earlier discussion of FIGS. 1-6, additional details of such device-to-device interactions or communication are not provided below.

(1) Entry in the "Open Gate" Mode:

Initially, the user with the mobile device 17 may approach the fare gate 70 that is open for entry (for example, "Entry OK" indicator lights are lit on the Unpaid Area side 87).

If the user has a valid ticket, the user may simply walk through the gate hands-free and the remote display (not shown) may show a message indicating that a valid ticket was tendered and a "Ticket Accepted" beep may be emitted from the fare gate's speakers (not shown). The user's mobile device 17 may also display a notification indicating that the ticket was tendered and accepted. The mobile device may also emit a "Ticket Accepted" beep and a corresponding vibration pattern. The user app 12 may decrease the count of valid tickets stored on the mobile device 17 by one.

If the user's mobile device does not have the FV User Application—like the User App 12 in FIG. 1—loaded, then, upon entering the Fare Gate Trigger Zone 85, the remote display may display a message informing the user to either purchase a ticket or use a traditional ticket. This may be accompanied by a loud "Invalid Entry Attempt" alert through the Fare Gate speakers.

On the other hand, if the user app is loaded on the user's mobile device, but there is no ticket or no valid ticket stored in the device, the remote display may show a "No Ticket Available" message and the Fare Gate speakers may emit the "No Ticket Available" alert sound. The user may also receive a notification on the mobile device indicating that no valid tickets were available, accompanied by the corresponding audible alert and vibration pattern.

In particular embodiments, altering of the user's cadence, such as, for example, pausing to let the person ahead go through the fare gate before proceeding, may be necessary in the Open Gate mode.

(2) Entry in the "Closed Gate" Mode:

Initially, the user with the mobile device 17 may approach the fare gate 70 that is open for entry (for example, "Entry OK" indicator lights are lit on the Unpaid Area side 87).

If the user has a valid ticket, as the user enters the Fare Gate Trigger Zone 85, the barrier (not shown) opens up and the user may simply walk through the gate hands-free. The remote display may show a message indicating that a valid ticket was tendered and a "Ticket Accepted" beep may be emitted from the Fare Gate's speakers. The user's mobile device 17 may display a notification indicating that the ticket was tendered and accepted. The mobile device may also emit a "Ticket Accepted" beep and a corresponding vibration pattern. The user app 12 may decrease the count of valid tickets stored on the mobile device 17 by one.

If the user's mobile device does not have the FV User Application—like the User App 12 in FIG. 1—loaded, then, upon entering the Fare Gate Trigger Zone 85, the remote display may show a message informing the user that the FV user app was not detected and that a traditional ticket should be used. In that case, the fare gate barrier may remain closed until a valid ticket (electronic or traditional) is presented.

On the other hand, if the user app is loaded on the user's mobile device, but there is no ticket or no valid ticket stored in the device, the remote display may show a "No Ticket Available" message and the Fare Gate speakers may emit the "No Ticket Available" alert sound. The user may also receive a notification on the mobile device indicating that no valid tickets were available, accompanied by the corresponding audible alert and vibration pattern.

(3) Exit in the "Open Gate" Mode:

Initially, the user with the mobile device 17 may approach the fare gate 70 that is open for exiting (for example, "Entry OK" indicator lights are lit on the Paid Area side 88).

If the user's mobile device has the FV user application loaded with a valid, active ticket, the user may simply walk through the fare gate and the remote display may show, for example, a "Thanks for Travelling with Us" message. The user's mobile device may also display a notification indicating that he or she has exited the system (or transit terminal). The mobile device may also emit an "Exiting" beep and a corresponding vibration pattern.

On the other hand, if the user's mobile device does not have the FV user app loaded (or has it loaded but without a valid, active ticket) and if the user enters the Fare Gate Trigger Zone, a message on the remote display may remind the user to use traditional media to "swipe out" for exit (if this is required by the transit service operator). This may be accompanied by a loud "Invalid Entry Attempt" alert through the Fare Gate's speakers. In certain embodiments, this "Invalid Entry Attempt" processing may also occur if the user's mobile device is not turned on (whether turned off by the user or as a result of a dead battery).

(4) Exit in the "Closed Gate" Mode:

Initially, the user with the mobile device 17 may approach the fare gate 70 that is open for exiting (for example, "Entry OK" indicator lights are lit on the Paid Area side 88).

If the user's mobile device has the FV user application loaded, as the user enters the Fare Gate Trigger Zone, the gate's barrier may open and the user may walk through the gate to exit. The remote display may show a "Thanks for Travelling with Us" message. The user's mobile device may also display a notification indicating that he or she has exited the system (or transit terminal). The mobile device may also emit an "Exiting" beep and a corresponding vibration pattern.

On the other hand, if the user's mobile device does not have the FV user app loaded and if the user enters the Fare Gate Trigger Zone, a message on the remote display may remind the user to use traditional media to "swipe out" for exit (if this is required by the transit service operator). In particular embodiments, the fare gate's barrier may remain closed until a valid ticket (electronic or traditional) is presented. In some embodiments, this kind of processing may also occur if the user's mobile device is not turned on (whether turned off by the user or as a result of a dead battery).

It is noted that, typically, the fare gate 70 may be designated as either an "Entry" fare gate or an "Exit" fare gate. The entry or exit direction may be changed under the control of station personnel. For example, the gate 70 may be set in one direction in the morning as an "Entry" gate and as an "Exit" gate in the afternoon. However, if needed, the controller driver 14 may be configured to dynamically determine the direction of the gate based upon the direction of passenger movement. In certain embodiments, additional hardware (not shown), such as, for example, motion sensors or cameras, may be provided at the transit station 60 to assist the controller driver 14 in detection of such direction. Alternatively, the camera devices 67-68 may provide the needed input to the controller driver 14 to enable the detection of the direction of passenger movement.

In some embodiments, the controller driver 14 may operate in conjunction with suitable hardware to detect presence of more than one person at a time within the fare gate trigger zone 85. Furthermore, both the user app 12 and the controller driver 14 may be configured to support may different types of tickets based upon the class of service (for example, regular, senior citizen, student, transit company employee, and the like), the time period (for example, peak time, off-peak time), and seasonal versus "pay-as-you-go" tickets. In certain embodiments, the controller driver 14 may be configured to detect if the same mobile device is used to tender tickets for more than one passenger. Such a situation may arise, for example, when a ticketed passenger pre-purchases more than one ticket and pays for a non-ticketed passenger by passing back the mobile device to the non-ticketed passenger after the ticketed passenger's ticket is validated.

Figure 7:
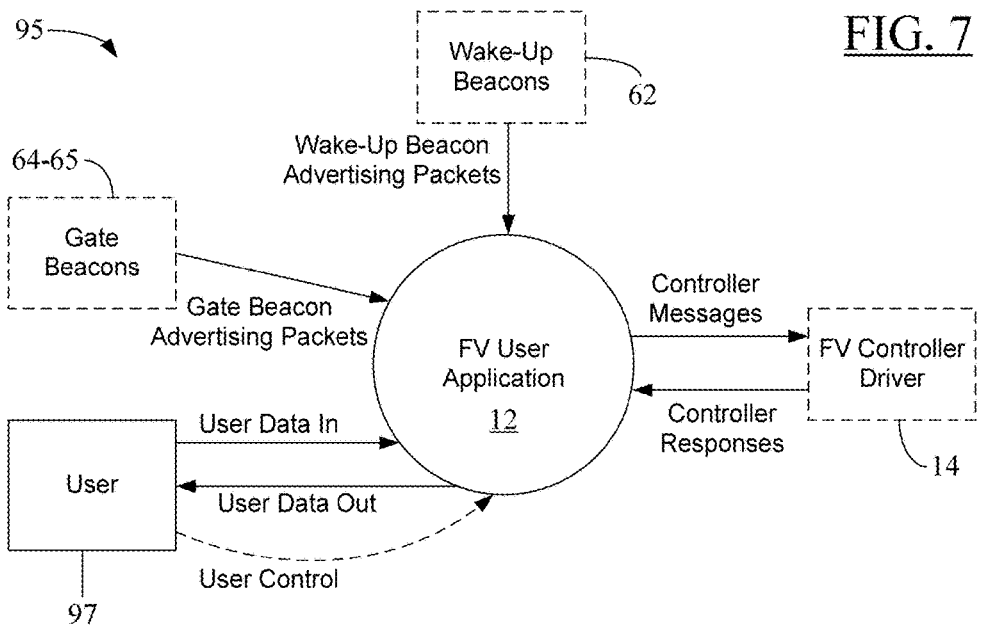
FIG. 7 is an exemplary context diagram for the FV user application in FIG. 1 according to particular embodiments of the present disclosure.
Figure 8:
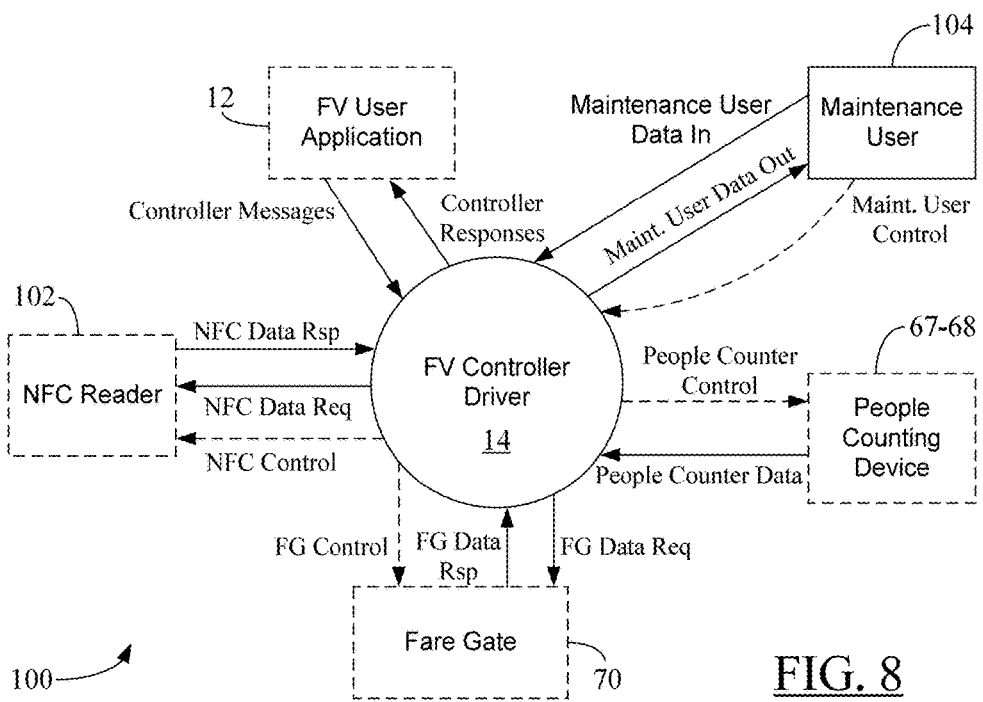
FIG. 8 shows an exemplary context diagram for the FV controller driver in FIG. 1 according to particular embodiments of the present disclosure.

FIG. 7 is an exemplary context diagram 95 for the FV user application 12 in FIG. 1 according to particular embodiments of the present disclosure. FIG. 8 shows an exemplary context diagram 100 for the FV controller driver 14 in FIG. 1 according to particular embodiments of the present disclosure. The context diagram 95 illustrates exemplary external and internal interfaces specific to the FV user app 12. Similar interfaces specific to the controller driver 14 are shown in the context diagram 100 of FIG. 8. For ease of discussion, FIGS. 7-8 are discussed together and the entities common between FIGS. 5 and 7-8 are identified using the same reference numerals. Furthermore, because of the earlier detailed discussion of various operational aspects of the FV user app 12 and the FV controller driver 14, only a brief description of the data and control flows shown in FIGS. 7-8 is provided. In the embodiments of FIGS. 7-8, solid arrows depict data flows and dashed arrows depict control flows. Furthermore, in FIGS. 7-8, blocks with solid lines—such as the blocks 97-98—depict external interfaces, whereas blocks with dashed lines—such as the blocks 62 and 70—depict internal sub-system interfaces.

Referring now to FIGS. 7-8, the "Controller Messages" are the messages sent between the use app 12 and the controller driver 14. These messages may typically contain commands or data which will inform the controller driver 14 how close the mobile device 17 is to the fare gate 70. The "Controller Responses" are responses sent by the controller driver 14 to the user app 12. The "Gate Beacon Advertising Packets" in FIG. 7 refer to information sent from the gate beacon(s) 64-65. This information may be used to detect the proximity of the mobile device 17 with the fare gate 70. On the other hand, the "Wake-Up Beacon Advertising Packets" in FIG. 7 refer to information sent from the wake-up beacon(s) 62. This information may be used to get the user app 12 into a ready state for entering through a fare gate—such as the fare gate 70—that is enabled for hands-free fare validation as per teachings of the present disclosure. In FIG. 7, the term "User Data In" refers to the data that a user 97 running the FV user app 12 (on the user's mobile device 17) enters through a user interface provided by the user app 12. On the other hand, the term "User Data Out" refers to the data that is displayed via the user interface to the user 97 running the FV user app 12. The term "User Control" refers to the control information sent from the mobile device 17 running the FV user app 12.

Referring now to FIG. 8, the "People Counter Data" are the data sent to the FV controller driver 14 by the people-counting devices 67-68 to aid in determining the number of people in the fare gate trigger zone 85. The "People Counter Control" is the control information for the people-counting device. This control information may include commands to enable or disable the sending of the "People Counter Data." The "FG Data Req" is a fare gate data request and includes the data sent to the fare gate 70 from the controller driver 14, typically during the processing of a transaction, such as, for example, a ticket validation transaction. The "FG Data Rsp" is a fare gate data response and includes the data returned from the fare gate 70 during the transaction processing or upon a command from the controller driver 14. The "FG Control" is the fare gate control information.

If a fare gate communicates with the controller driver 14 via an NFC interface, such as, for example, the NFC interface 74 shown in FIG. 5, then there may be an NFC reader/writer 102 present at the fare gate. The NFC reader/writer 102 may communicate with the controller driver 14 via the NFC interface 74. In certain embodiments, there may be individual NFC readers/writers for the entrance NFC interface 76 and the exit NFC interface 77 in FIG. 5. The "NFC Data Req" are data requests sent to the NFC reader/writer 102, the "NFC Data Rsp" are responses received from the NFC reader/writer 102, and the "NFC Control" is the control information associated with the NFC reader/writer 102 to facilitate various NFC-based transactions.

If the controller driver 14 supports the earlier-discussed maintenance mode, a maintenance user 104—such as, for example, a service person or employee of the transit station 60 or a transit company—may interact with the system running the controller driver 14 to perform maintenance tasks. The controller unit 18 in FIG. 2 is an example of such a system. The system may provide a user interface to support maintenance-related content displays. In that regard, the "Maintenance User Data In" is the data that the maintenance user 104 enters through the user interface when in the maintenance mode, the "Maint. User Data Out" is the data that is displayed to the maintenance user 104 when in the maintenance mode, and the "Maint. User Control" is the control information sent to the controller driver 14 when in the maintenance mode.

Figure 9:
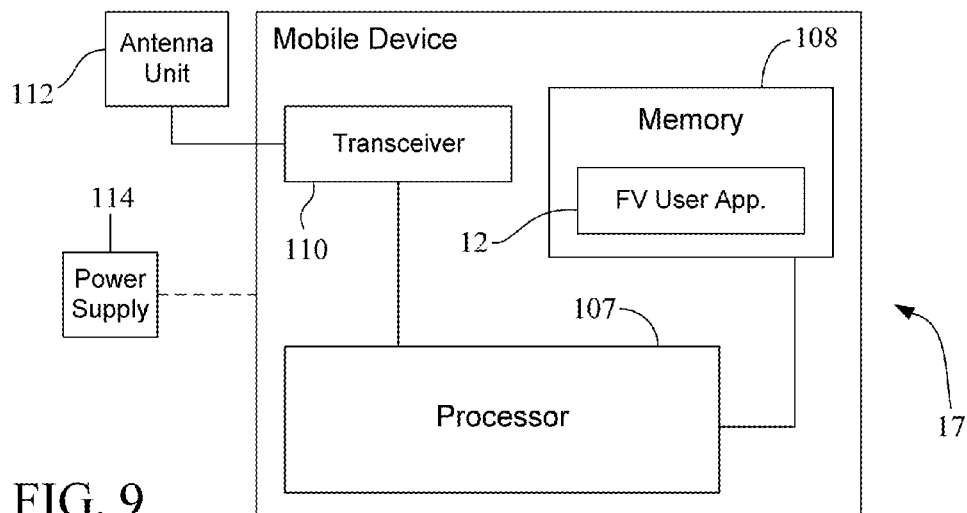
FIG. 9 is a block diagram of an exemplary mobile device according to one embodiment of the present disclosure.

FIG. 9 is a block diagram of an exemplary mobile device 17 according to one embodiment of the present disclosure. As noted earlier, the mobile or wireless device 17 may be a UE, a smartphone, or any other wireless device operable for hands-free fare validation as per particular embodiments of the present disclosure. The wireless device 17 may include a processor 107, a memory 108 (which may, in some embodiments, also include memory on UE's Subscriber Identity Module (SIM) card), a transceiver 110, and an antenna unit 112. The memory 108 may include the program code for the FV user app 12. The program code may be executed by the processor 107. Upon execution of the user app's program code by the processor 107, the processor may configure the mobile device 17 to perform various mobile device-specific tasks associated with the hands-free fare validation methodology as per the teachings of the present disclosure. In one embodiment, such tasks may include, for example, the process steps illustrated in FIG. 3. Such tasks also may include, for example, mobile device-specific (or FV user app-based) operations discussed earlier with reference to FIGS. 5-8.

The memory 108 may store data or other related communications received from the controller unit 18 (FIG. 2) as well as other content needed to facilitate hands-free fare validation. For example, in one embodiment, the memory 108 may store, for example, pre-purchased electronic ticket(s), itinerary information, electronic purchase receipts, Bluetooth beacon ID, and the like. The memory 108 also may store results of fare validation (for example, ticket activation status, valid/invalid transaction, and the like) received from the controller unit 18 as well as entry/exit notifications for the user.

The transceiver 110 may communicate with the processor 107 to perform transmission/reception of data, control, or other signaling information (via the antenna unit 112) to/from the controller unit 18 with which the mobile device 17 may be in communication during hands-free fare validation. In particular embodiments, the transceiver 110 may support the Bluetooth based—such as, for example, the Bluetooth LE-based—communication with the controller unit 18 to implement the hands-free fare validation methodology as per the teachings of the present disclosure. The transceiver 110 may be a single unit or may comprise of two separate units—a transmitter (not shown) and a receiver (not shown). The antenna unit 112 may include one or more antennas. Alternative embodiments of the wireless device 17 may include additional components responsible for providing additional functionality, including any of the functionality identified herein, such as, for example, receiving Bluetooth beacon signals, transmitting electronic ticket information, communicating with the controller unit 18, displaying various notifications or messages to the user of the device 17, etc., and/or any functionality necessary to support the solution as per the teachings of the present disclosure. For example, in one embodiment, the wireless device 17 may also include an on-board power supply unit 114 (e.g., a battery or other source of power) to allow the device to be operable in a mobile manner.

In one embodiment, the mobile device 22 may be configured (in hardware, via software, or both) to implement device-specific aspects of hands-free fare validation as per teachings of the present disclosure. As noted before, the software or program code may be part of the FV user app 12 and may be stored in the memory 108 and executable by the processor 107. For example, when existing hardware architecture of the device 22 cannot be modified, the functionality desired of the device 22 may be obtained through suitable programming of the processor 107 using the program code of the FV user app 12. The execution of the program code (by the processor 107) may cause the processor to perform as needed to support the hands-free fare validation solution as per the teachings of the present disclosure. Thus, although the wireless device 22 may be referred to as "performing," "accomplishing," or "carrying out" (or similar such other terms) a function/task or a process or a method step, such performance may be technically accomplished in hardware and/or software as desired.

Figure 10:
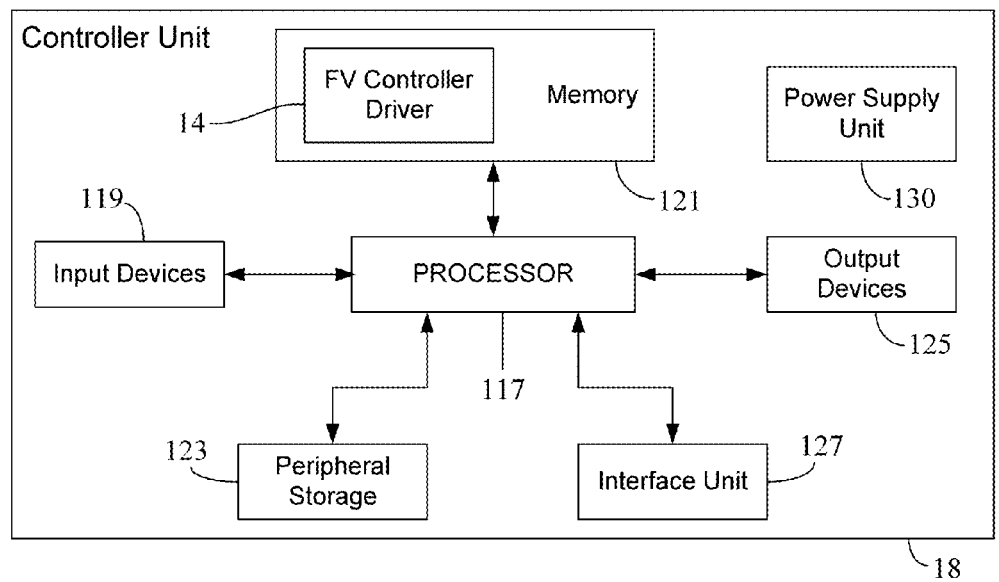
FIG. 10 depicts a block diagram of an exemplary controller unit according to one embodiment of the present disclosure.

FIG. 10 depicts a block diagram of an exemplary controller unit 18 according to one embodiment of the present disclosure. The controller unit or system 18 may be suitably configured—in hardware and/or software—to implement the hands-free fare validation methodology according to the teachings of the present disclosure. The controller unit 18 may include a processor 117 and ancillary hardware to accomplish hands-free fare validation discussed before. The processor 117 may be configured to interface with a number of external devices. In one embodiment, a number of input devices 119 may be part of the system 117 and may provide data inputs—such as user input, camera images, statistical data, and the like—to the processor 117 for further processing. The input devices 119 may include, for example, a touchpad, a camera, a proximity sensor, a GPS sensor, a computer keyboard, a touch-screen, a joystick, a physical or virtual "clickable button," a computer mouse/pointing device, and the like. In FIG. 10, the processor 117 is shown coupled to a system memory 121, a peripheral storage unit 123, one or more output devices 125, and a network interface unit 127. A display screen is an example of an output device 125. In some embodiments, the controller unit 18 may include more than one instance of the devices shown. In various embodiments, all of the components shown in FIG. 10 may be housed within a single housing. In other embodiments, the controller unit 18 may not include all of the components shown in FIG. 10. Furthermore, the controller unit 18 may be configured as a standalone system, as a server system, as a client system, or in any other suitable form factor.

In particular embodiments, the controller unit 18 may include more than one processor (e.g., in a distributed processing configuration). When the controller unit 18 is a multiprocessor system, there may be more than one instance of the processor 117 or there may be multiple processors coupled to the processor 117 via their respective interfaces (not shown). The processor 117 may be a System on Chip (SoC) and/or may include more than one Central Processing Units (CPUs).

The system memory 121 may be any semiconductor-based storage system such as, for example, Dynamic Random Access Memory (DRAM), Static RAM (SRAM), Synchronous DRAM (SDRAM), Rambus® DRAM, flash memory, various types of Read Only Memory (ROM), and the like. In some embodiments, the system memory 121 may include multiple different types of semiconductor memories, as opposed to a single type of memory. In other embodiments, the system memory 121 may be a non-transitory data storage medium.

The peripheral storage unit 123, in various embodiments, may include support for magnetic, optical, magneto-optical, or solid-state storage media such as hard drives, optical disks (such as Compact Disks (CDs) or Digital Versatile Disks (DVDs)), non-volatile Random Access Memory (RAM) devices, Secure Digital (SD) memory cards, Universal Serial Bus (USB) memories, and the like. In some embodiments, the peripheral storage unit 123 may be coupled to the processor 117 via a standard peripheral interface such as a Small Computer System Interface (SCSI) interface, a Fibre Channel interface, a Firewire® (IEEE 1394) interface, a Peripheral Component Interface Express (PCI Express™) standard based interface, a USB protocol based interface, or another suitable interface. Various such storage devices may be non-transitory data storage media.

As mentioned earlier, a display screen may be an example of the output device 125. Other examples of an output device include a graphics/display device, a computer screen, an alarm system, or any other type of data output device. In some embodiments, the input device(s) 119 and the output device(s) 125 may be coupled to the processor 117 via an I/O or peripheral interface(s).

In one embodiment, the network interface unit 127 may communicate with the processor 117 to enable the controller unit 18 to couple to a network or a communication interface. In another embodiment, the network interface unit 127 may be absent altogether. The network interface 127 may include any suitable devices, media and/or protocol content for connecting the controller unit 18 to a network/interface—whether wired or wireless. In various embodiments, the network may include Local Area Networks (LANs), Wide Area Networks (WANs), wired or wireless Ethernet, telecommunication networks, or other suitable types of networks/interfaces. For example, the network may be a packet-switched network such as, for example, an Internet Protocol (IP) network like the Internet, a circuit-switched network, such as the Public Switched Telephone Network (PSTN), or a combination of packet-switched and circuit-switched networks. In another embodiment, the network may be an IP Multimedia Subsystem (IMS) based network, a satellite-based communication link, a Bluetooth or Bluetooth LE (BLE) based network/interface, an NFC based network/interface, a Worldwide Interoperability for Microwave Access (WiMAX) system based on Institute of Electrical and Electronics Engineers (IEEE) standard IEEE 802.16e, an IP-based cellular network such as, for example, a Third Generation Partnership Project (3GPP) or 3GPP2 cellular network like a Long Term Evolution (LTE) network, a combination of cellular and non-cellular networks, a proprietary corporate network, a Public Land Mobile Network (PLMN), and the like.

The controller unit 18 may include an on-board power supply unit 130 to provide electrical power to various system components illustrated in FIG. 10. The power supply unit 130 may receive batteries or may be connectable to an AC electrical power outlet. In one embodiment, the power supply unit 130 may convert solar energy or other renewable energy into electrical power.

In one embodiment, a non-transitory, computer-readable data storage medium, such as, for example, the system memory 121 or a peripheral data storage unit, such as a removable memory, may store program code or software for the FV controller driver 14. In the embodiment of FIG. 10, the system memory 121 is shown to include such program code. The processor 117 may be configured to execute the program code, whereby the controller unit 18 may be operative to perform various controller-unit specific tasks associated with the hands-free fare validation methodology as per the teachings of the present disclosure. In one embodiment, such tasks may include, for example, the process steps illustrated in FIG. 4. Such tasks also may include, for example, relevant controller driver-based operations discussed earlier with reference to FIGS. 5-8. The program code or software may be proprietary software or open source software which, upon execution by the processor 117, may enable the controller unit 18 to perform controller unit-specific operations to support the hands-free fare validation approach as per teachings of the present disclosure as well as to support other non-validation related actions (such as, for example, operating in the maintenance mode).

In the preceding description, for purposes of explanation and not limitation, specific details are set forth (such as particular architectures, interfaces, techniques, etc.) in order to provide a thorough understanding of the disclosed technology. However, it will be apparent to those skilled in the art that the disclosed technology may be practiced in other embodiments that depart from these specific details. That is, those skilled in the art will be able to devise various arrangements which, although not explicitly described or shown herein, embody the principles of the disclosed technology. In some instances, detailed descriptions of well-known devices, circuits, and methods are omitted so as not to obscure the description of the disclosed technology with unnecessary detail. All statements herein reciting principles, aspects, and embodiments of the disclosed technology, as well as specific examples thereof, are intended to encompass both structural and functional equivalents thereof. Additionally, it is intended that such equivalents include both currently known equivalents as well as equivalents developed in the future, such as, for example, any elements developed that perform the same function, regardless of structure.

Thus, for example, it will be appreciated by those skilled in the art that block diagrams herein (e.g., in FIGS. 2 and 9-10) can represent conceptual views of illustrative circuitry or other functional units embodying the principles of the technology. Similarly, it will be appreciated that the flowcharts in FIGS. 3-4 represent various processes which may be substantially performed by a respective processor (e.g., the processor 107 in FIG. 9 and the processor 117 in FIG. 10, respectively). Such a processor may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Some or all of the functionalities described above in the context of FIGS. 1-8 also may be provided by a respective processor 107 or 117, in the hardware and/or software. Any of the processors 107 and 117 may employ distributed processing in certain embodiments.

When certain inventive aspects require software-based processing, such software or program code may reside in a computer-readable data storage medium. As noted earlier with reference to FIG. 10, such data storage medium may be part of the peripheral storage 123, or may be part of the system memory 121, or the processor's 117 internal memory (not shown). In case of the embodiment in FIG. 9, such data storage medium may be part of the memory 108 or the processor's 107 internal memory (not shown). In certain embodiments, the processors 107 and 117 may execute instructions stored on a respective such medium to carry out the software-based processing. The computer-readable data storage medium may be a non-transitory data storage medium containing a computer program, software, firmware, or microcode for execution by a general purpose computer or a processor mentioned above. Examples of computer-readable storage media include a ROM, a RAM, a digital register, a cache memory, semiconductor memory devices, magnetic media such as internal hard disks, magnetic tapes and removable disks, magneto-optical media, and optical media such as CD-ROM disks and DVDs.

Alternative embodiments of the controller unit 18 according to inventive aspects of the present disclosure may include additional components responsible for providing additional functionality, including any of the functionality identified above and/or any functionality necessary to support the solution as per the teachings of the present disclosure. Although features and elements are described above in particular combinations, each feature or element can be used alone without the other features and elements or in various combinations with or without other features. As mentioned before, various FV controller driver-based functions and FV user app-based functions discussed herein may be provided through the use of hardware (such as circuit hardware) and/or hardware capable of executing software/firmware in the form of coded instructions or microcode stored on a computer-readable data storage medium (mentioned above). Thus, such functions and illustrated functional blocks are to be understood as being either hardware-implemented and/or computer-implemented, and thus machine-implemented.

The foregoing describes a system and method in which the Bluetooth technology is used in conjunction with a user application on a mobile device to facilitate hands-free fare validation at a transit station. The user app communicates with a controller driver in a controller unit that interfaces with a compliant fare gate. Bluetooth beacons are used to determine a passenger's proximity to the gate and camera-like devices determine whether a passenger has entered a fare validation zone. A user with a valid and active electronic ticket on their mobile device may simply walk through the fare gate "hands free" without the need to search for a physical ticket or a smartcard or a mobile phone. This hassle-free approach may significantly improve the user experience and passenger throughput through fare gates. Furthermore, the Bluetooth-based or Bluetooth LE-based automated fare validation system may detect and provide feedback to the passenger, when a passenger enters into a "Paid Area" with a valid electronic ticket or when the passenger, with a mobile ticket previously activated, exits from the Paid Area. The system also may detect, and provide external visual and audio alerts, when a passenger enters into the Paid Area without a valid permit for travel or attempts to exit from the Paid Area without a valid permit for travel. Overall, passenger throughput into and out of the Paid Area is increased, especially during peak periods, using the disclosed hands-free ticket validation approach.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method to facilitate hands-free fare validation when a user carrying a mobile device approaches a fare validation zone at a transit station, wherein the method comprises performing the following using a controller unit at the transit station:
    receiving a notification that the user has entered the fare validation zone;
    identifying the mobile device carried by the user based on signals received from the mobile device over a Bluetooth interface;
    receiving electronic ticket information from the mobile device over the Bluetooth interface;
    sending the electronic ticket information received from the mobile device to an entry control gate at the transit station;
    receiving a confirmation message from the entry control gate indicating that the electronic ticket sent by the controller unit is a valid transit ticket; and
    sending a ticket acceptance response to the mobile device over the Bluetooth interface, thereby informing the user of the mobile device to continue towards an entry gate at the transit station in a hands-free manner.

2. The method of claim 1, wherein receiving the notification includes:
    receiving the notification from a digital camera connected to the controller unit.

3. The method of claim 1, wherein the entry control gate is communicatively coupled to the controller unit via an Ethernet connection.

4. The method of claim 1, wherein the Bluetooth interface is a Bluetooth Low Energy (BLE) interface.

5. The method of claim 1, wherein the method comprises further performing the following using the controller unit:
    storing at least one of the following information in a memory:
        operational statistics;
        a first count of users with valid electronic tickets;
        a second count of users with invalid electronic tickets;
        a third count of total number of users entering the transit station;
        a fourth count of total number of users exiting the transit station; and
        information about Bluetooth beacon signals transmitted to detect presence of mobile devices in the fare validation zone.

6. The method of claim 1, further comprising:
determining that an electronic ticket received from the mobile device is invalid; and
sending a ticket rejection response to the mobile device over the Bluetooth interface, thereby instructing the mobile device to generate an alert for the user.

7. A controller unit comprising:
an interface unit operable to perform the following:
   receive a notification that a user has entered a fare validation zone at a transit station, and
   receive electronic ticket information from a mobile device carried by the user over a Bluetooth interface;
a memory for storing program instructions and the electronic ticket information; and
a processor coupled to the interface unit and to the memory, wherein the processor is operable to execute the program instructions, which, when executed by the processor, cause the controller unit to perform the following to facilitate hands-free fare validation when the user carrying the mobile device approaches the fare validation zone:
   identify the mobile device carried by the user based on signals received from the mobile device over the Bluetooth interface,
   send the electronic ticket information received from the mobile device to an entry control gate at the transit station using the interface unit;
   receive, via the interface unit, a confirmation message from the entry control gate indicating that the electronic ticket sent by the controller unit is a valid ticket;
   determine that the electronic ticket is valid for transit, and
   send a ticket acceptance response to the mobile device over the Bluetooth interface using the interface unit, thereby informing the user of the mobile device to continue towards an entry gate at the transit station in a hands-free manner.

8. The controller unit of claim 7, wherein the program instructions, when executed by the processor, cause the controller unit to further perform the following:
   determine that an electronic ticket received from the mobile device is invalid; and
   send a ticket rejection response to the mobile device over the Bluetooth interface using the interface unit, thereby instructing the mobile device to generate an alert for the user.

\* \* \* \* \*